(12) United States Patent
Duffield

(10) Patent No.: US 9,280,229 B2
(45) Date of Patent: Mar. 8, 2016

(54) TOUCH ALPHABET AND COMMUNICATION SYSTEM

(71) Applicant: Robert H Duffield, Coeur D'Alene, ID (US)

(72) Inventor: Robert H Duffield, Coeur D'Alene, ID (US)

(*) Notice: Subject to any disclaimer, the term of this patent is extended or adjusted under 35 U.S.C. 154(b) by 0 days.

(21) Appl. No.: 14/552,350

(22) Filed: Nov. 24, 2014

(65) Prior Publication Data

US 2015/0077378 A1     Mar. 19, 2015

Related U.S. Application Data

(63) Continuation of application No. 13/475,883, filed on May 18, 2012, now Pat. No. 8,896,555.

(60) Provisional application No. 61/488,703, filed on May 20, 2011.

(51) Int. Cl.
*G06F 3/041* (2006.01)
*G06F 3/0488* (2013.01)

(52) U.S. Cl.
CPC ............ *G06F 3/041* (2013.01); *G06F 3/04883* (2013.01); *G06F 2203/04106* (2013.01); *G06F 2203/04808* (2013.01)

(58) Field of Classification Search
CPC ... G06F 3/0235; G06F 3/041; G06F 3/04883; G06F 2203/04106; G06F 2203/04808

USPC ............ 345/168–178, 156; 178/18.01–18.09, 178/18.11

See application file for complete search history.

(56) References Cited

U.S. PATENT DOCUMENTS

2001/0028340 A1* 10/2001 Mailman ........................ 345/156
2012/0050187 A1* 3/2012 Chen ............................ 345/173

* cited by examiner

*Primary Examiner* — Stephen Sherman
(74) *Attorney, Agent, or Firm* — Mark Farrell; Timberline Patent Law Group PLLC

(57) ABSTRACT

A touch alphabet and communication system is provided. The communication system uses a predetermined set of touch gestures, such as fingertip touch patterns performable on keyless touch-sensitive surfaces, to express the user's desired communication. The touch-sensitive surface may be the touch screen display of a computer, tablet device, cell phone, or a touch-sensitive pad, for example. The finger touch patterns are based on a limited set of unique and ergonomically pleasing finger positions that may be performed in a limited area. The touch alphabet allows the user to comprehensively communicate without looking at the communication device, and with just one hand, or in another implementation, with two hands. Thus, a user can comfortably tap an entire alphabet and related functions, with one hand, without having to visualize the user interface surface or hunt for individual keys.

11 Claims, 28 Drawing Sheets

CODE           LEFT HAND EXAMPLE
105  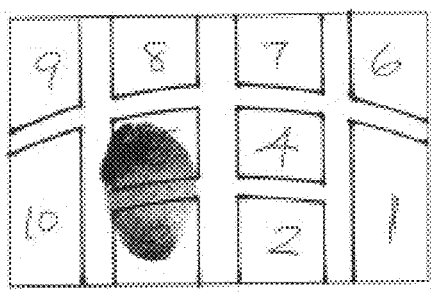 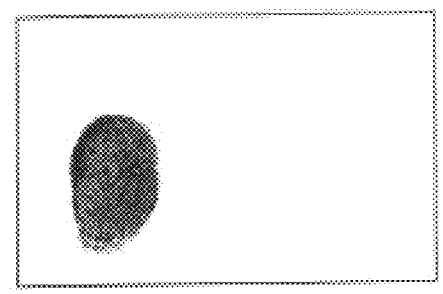
106  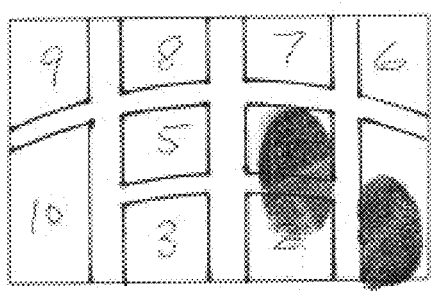 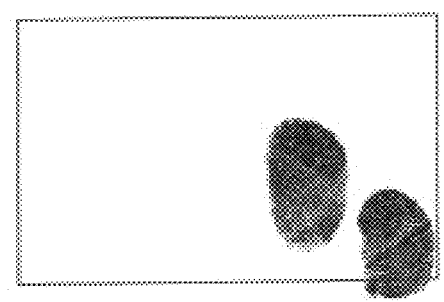
107  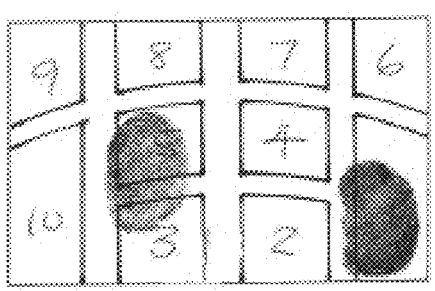 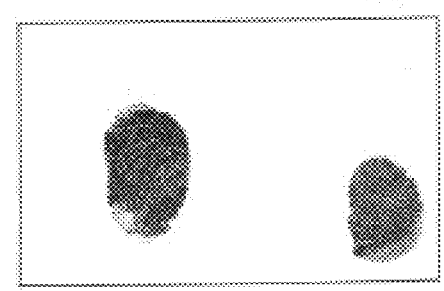
108  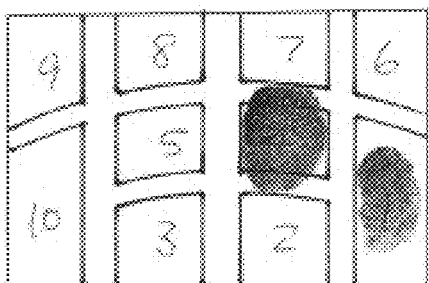 
FIG. 7

CODE             LEFT HAND EXAMPLE
113 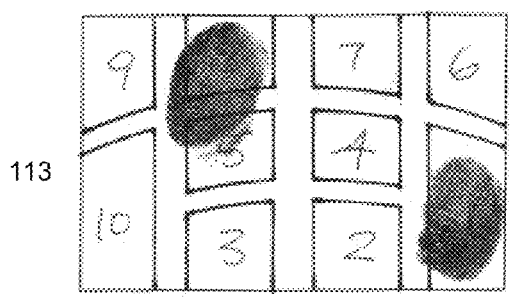 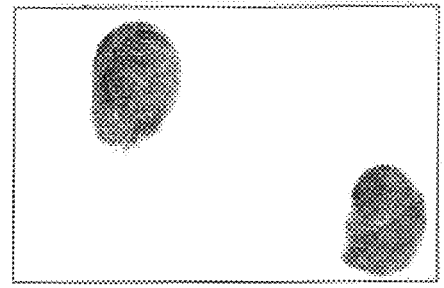
114 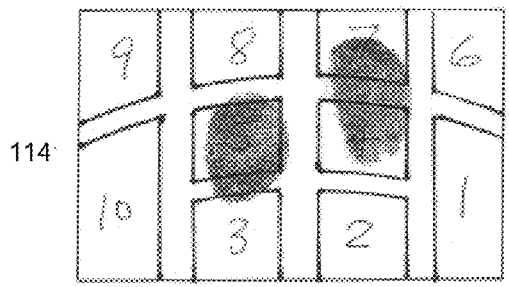 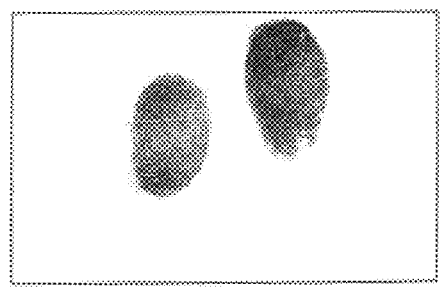
115 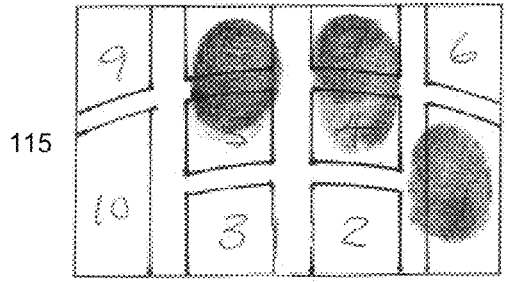 
116 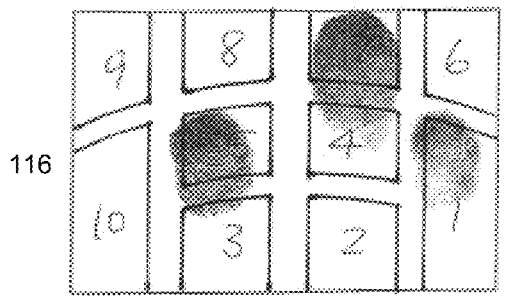 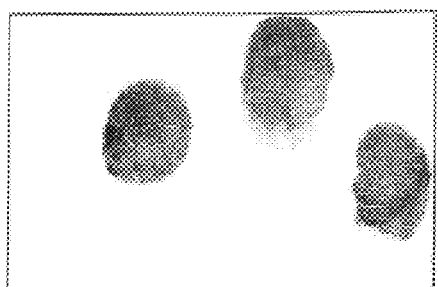
FIG. 9

CODE  LEFT HAND EXAMPLE
117 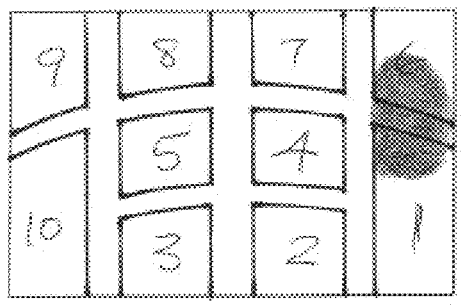 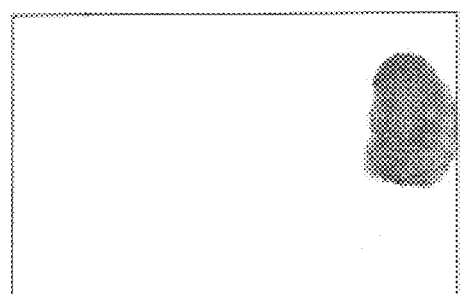
118 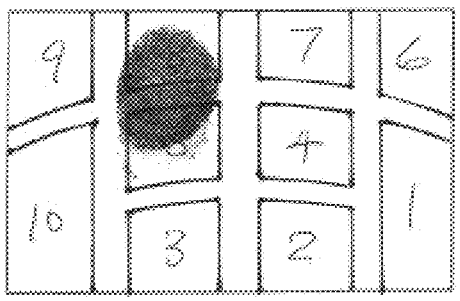 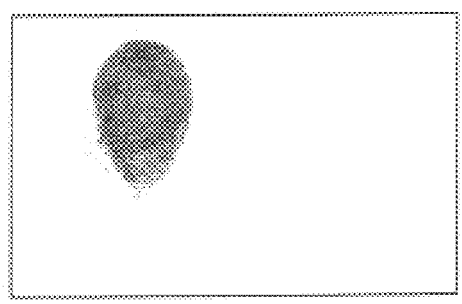
119 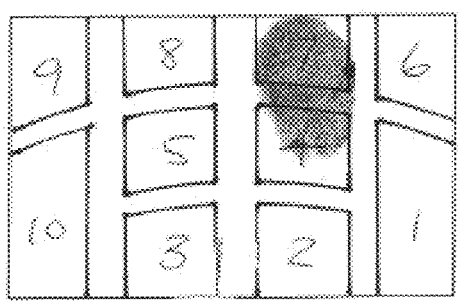 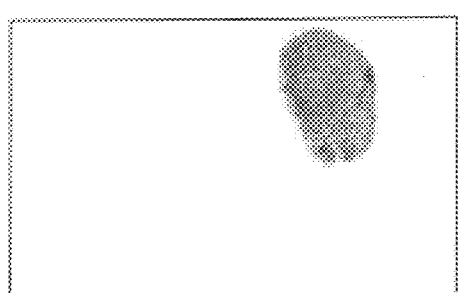
120 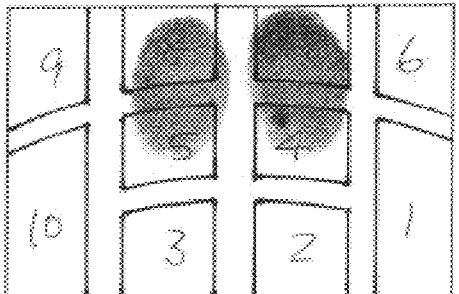 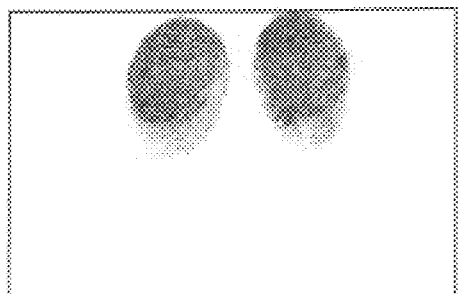
FIG. 10

CODE　　　　　　　LEFT HAND EXAMPLE
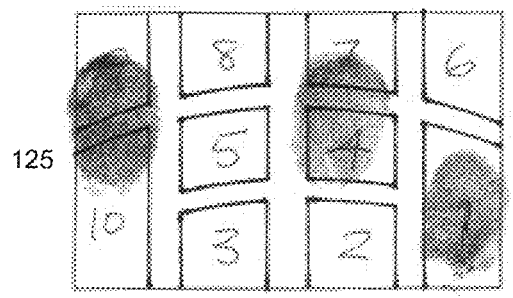
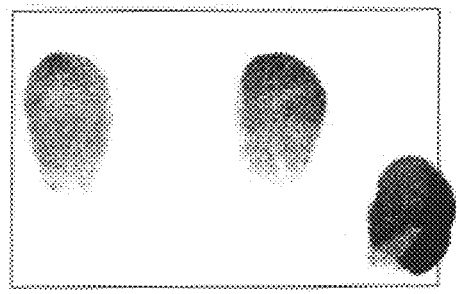
125
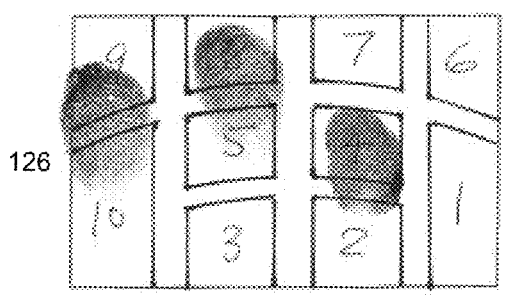
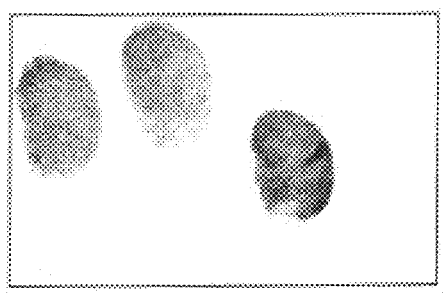
126
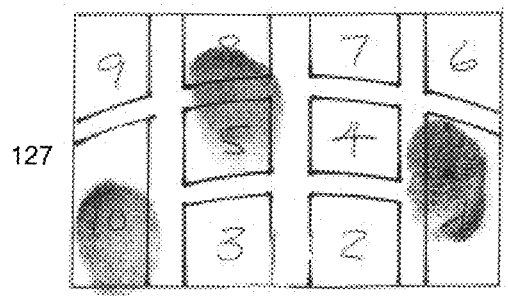
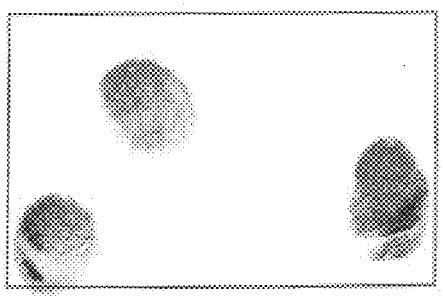
127
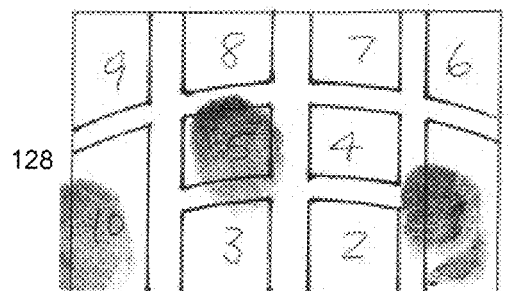
128
FIG. 12

CODE  LEFT HAND EXAMPLE
137 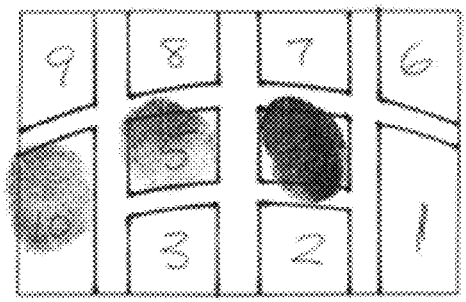 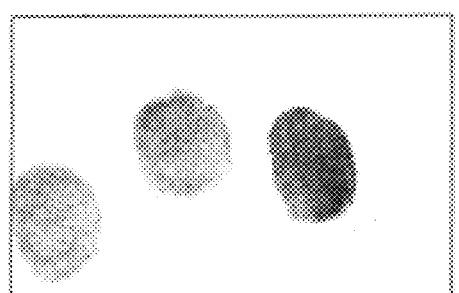
138 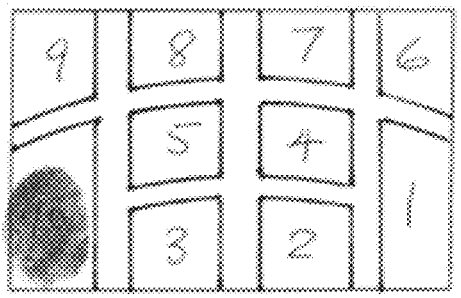 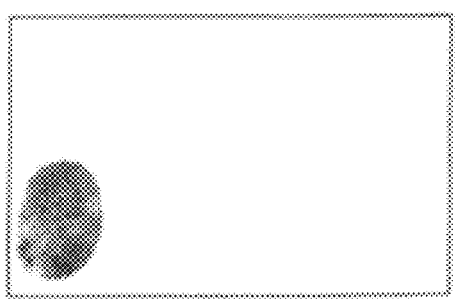
139 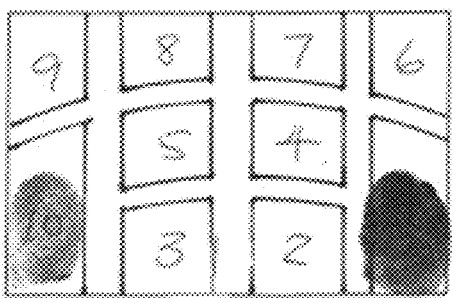 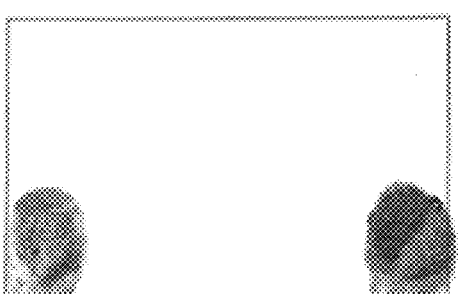
140 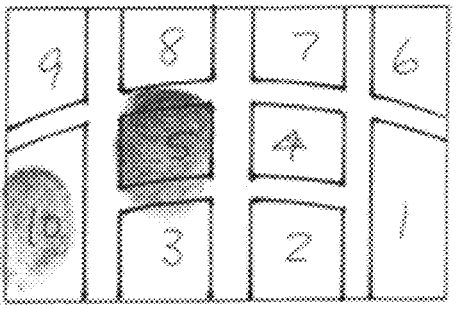 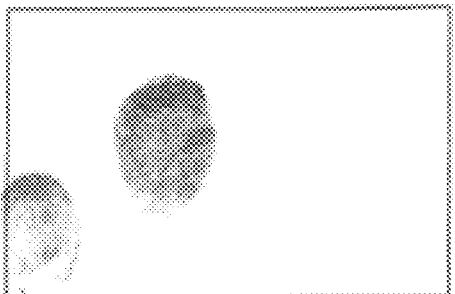
FIG. 15

CODE
RIGHT HAND EXAMPLE
124
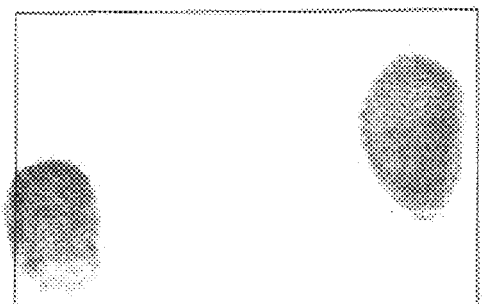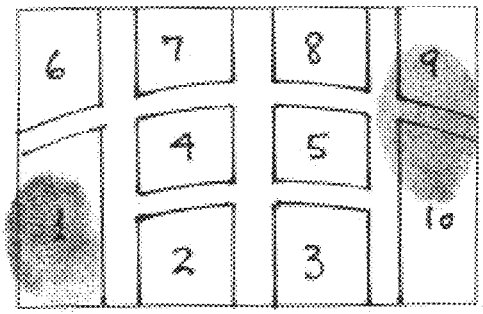
125
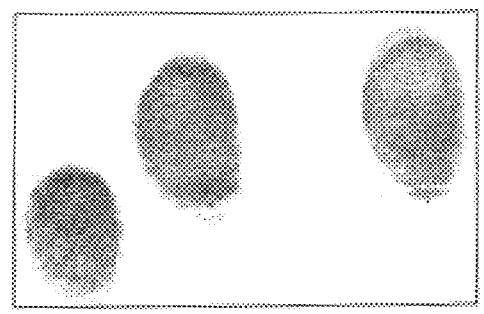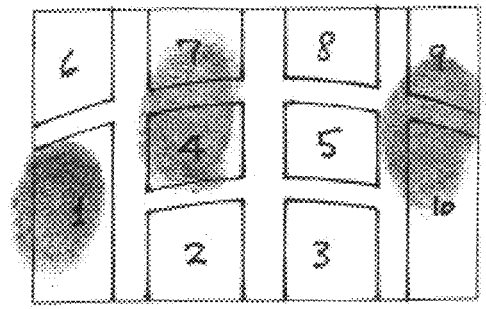
126
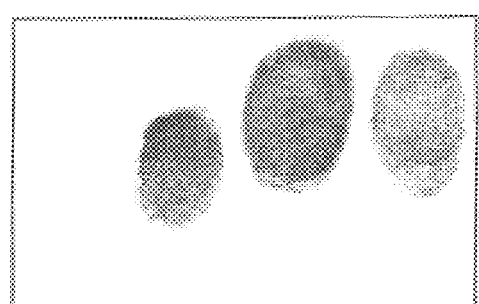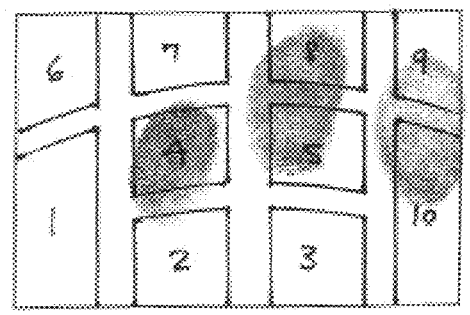
FIG. 24

TOUCH ALPHABET AND COMMUNICATION SYSTEM

RELATED APPLICATIONS

This patent application claims the benefit of priority to U.S. patent application Ser. No. 13/475,883 to Duffield, now U.S. Pat. No. 8,896,555, which in turn claims the benefit of priority to U.S. Provisional Patent Application No. 61/488,703 to Duffield, entitled "Touch Alphabet and Communication System," filed May 20, 2011, and incorporated herein by reference in its entirety.

BACKGROUND

Personal electronic devices provide enjoyment and utility for all ages. Available interfaces between humans and devices, however, remain limiting. Input devices and user interfaces for computers, cell phones, and other electronics remain a bottleneck with respect to speed and ease of use, and usually require a level of manual dexterity. Conventional keyboards, touch screens, and computer mice require at least some training, and remain a cumbersome link between the nimbleness of human thought and the brute speed of an electronic processor. Speech recognition and visual gesture recognition that generate digital input for devices are improvements, but humans can think and speak much faster than most input devices can capture, and electronic devices can process data much faster that human input devices can send. Thus, there is a gap between the world of humans and the electronic devices they use.

Contrary to expectations, providing an easy user interface for electronic communication devices has become more difficult as the devices have become more sophisticated. Increased processing power provides smaller devices and increased mobility. Thus, the physical footprint of the human interface has merely become smaller, not always better. The reduced size often requires even more manual dexterity and more focus in order to generate accurate input. The miniaturized "qwerty" keyboard of a cell phone is very compact, an advantage, but requires a great deal of focus to achieve both speed and satisfactory accuracy of the message being created. Typing is sometimes performed with two thumbs. Touching icons on a display to actuate functions is an improvement over typing individual letters, but when a human-readable message needs to be generated, the cell phone or tablet device often pops up a virtual qwerty-style keyboard in miniature.

SUMMARY

A touch alphabet and communication system is provided. The communication system uses a predetermined set of touch gestures, such as fingertip touch patterns performable on keyless touch-sensitive surfaces, to express the user's desired communication. The touch-sensitive surface may be the touch screen display of a computer, tablet device, cell phone, or a touch-sensitive pad, for example. The finger touch patterns are based on a limited set of unique and ergonomically pleasing finger positions that may be performed in a limited area. The touch alphabet allows the user to comprehensively communicate without looking at the communication device, and with just one hand, or in another implementation, with two hands. Thus, a user can comfortably tap an entire alphabet and related functions, with one hand, without having to visualize the user interface surface or hunt for individual keys.

This summary section is not intended to give a full description of touch alphabets and communication systems. A detailed description with example implementations follows.

BRIEF DESCRIPTION OF THE DRAWINGS

FIGS. 6-16 are diagrams of a set of touch patterns that constitute an example database of "one-handed" finger-touch patterns.

FIGS. 18-24 are diagrams of a set of touch patterns that constitute an example database of finger-touch patterns for the right hand.

DETAILED DESCRIPTION

Overview

Figure 1:
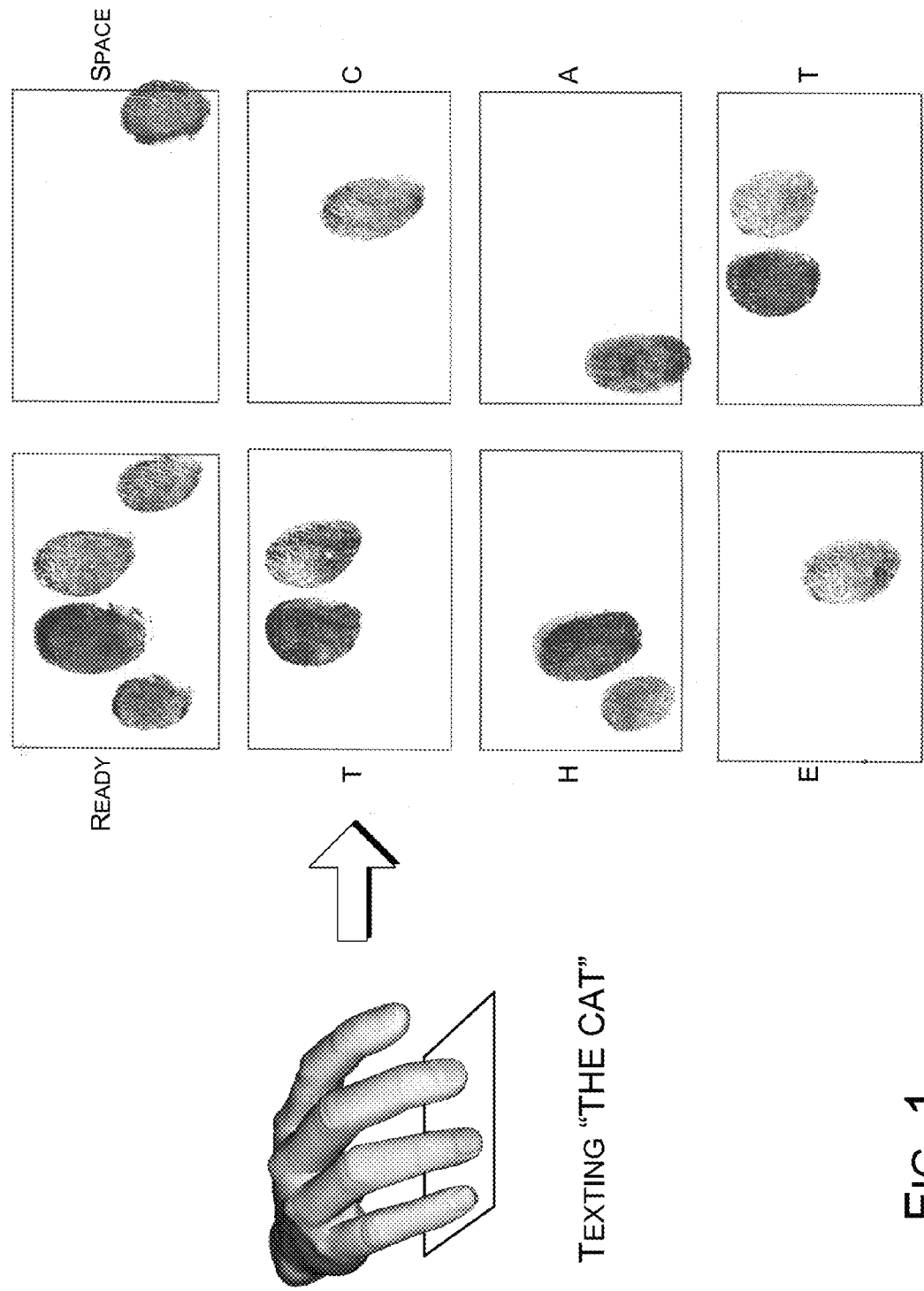
FIG. 1 is a diagram of example texting using a touch alphabet.

This disclosure describes a touch alphabet and communication system. In one implementation, the communication system uses a predetermined set of touch gestures, such as finger touch placements and finger touch combinations, performable on various keyless touch-sensitive surfaces, to express the user's desired communication. The touch alphabet allows the user to comprehensively communicate without looking at the communication device, and with just one hand, although in one implementation, two hands may be used. Thus, a user can comfortably tap an entire alphabet and related functions, with one hand, without having to visualize the user interface surface (i.e., without having to look at the touch surface and without having to hunt for individual keys).

Keyless, as used herein, means that the surface that constitutes the touch input or communication interface does not require visible or actual key areas, as on a keyboard, and also does not have such discrete keys assigned in 1:1 relationship with individual finger strokes or individual touches for actuation. Conventionally, a key of a typewriter or keyboard is dedicated to a 1:1 relationship between a finger contacting the individual key and an intended alphanumeric character assigned to the key. Rather, a keyless region as used for sensor input herein, senses one touch or multiple simultaneous touches (e.g., fingertip touches) corresponding to a select and limited set of ergonomically easy gestures, and the gestures do not have to be performed on specific, discrete keys as a keyboard would have. The select and limited set of ergonomically easy gestures is also designed to accommodate users with very long fingernails, a longstanding problem for communicating on small devices. The set of ergonomically easy gestures are programmable to alphabets, number, symbols, etc., and sets of navigation functions.

The touch-sensitive surface may be the touch screen display of a computer, tablet device, cell phone, or a touch-sensitive pad, for example. The finger touch patterns are based on approximately forty-four unique and ergonomically pleasing finger positions that can be performed or gestured on an area or subarea of a surface (hereinafter, "region") that is approximately four finger widths wide and approximately three fingertip heights high. The ergonomically easy and pleasing finger positions are based on combinations of finger positions assumed while the hand or wrist is at rest and as if comfortably "tapping" with one or more fingers on a surface.

The finger touch patterns may constitute a set designed to be implemented by only one hand at a time (right-handed and left-handed implementations being mirror images of each other). The right-handed set does not need the left-handed set, and vice versa. Each set can function independently of the other, so that the user can communicate completely with only one hand. On the other hand, both right-handed and left-handed versions can be used with each other at the same time. Or, the finger touch patterns may also constitute a different set of patterns that can be implemented by splitting the set of symbols and functions between right and left hands, which must be used in harmony. The finger touch patterns can be programmed with different communication objects, e.g., with alphanumeric characters and functions. For example, each member of a set of touch patterns can be assigned with a letter of an alphabet, a number, a symbol, a word, a phrase, an image, a file operation, or a device navigation function.

In one implementation, an example system includes a database of stored touch patterns for communicating on a keyless region of an electronic input device, each stored touch pattern assigned an associated communication object. A sensor detects an input touch pattern on the keyless region. A differentiator then compares the sensed touch pattern with corresponding stored touch patterns in the database to recognize one of the stored touch patterns. Then, an interpreter collects each communication object associated with each recognized touch pattern. These may be passed, signaled, or transmitted to a device. Thus, the example system typically constitutes a user interface device.

The database of stored touch patterns can include a mix of single finger touch patterns and multiple finger touch patterns, each multiple finger touch pattern consisting of a configuration of multiple simultaneous finger touches on the keyless region. The database or the mix can thus be a set of touch patterns for communicating a complete alphabet and related functions with only one hand at a time, e.g., on a cell phone display, or can be a set of touch patterns for communicating with both right and left hands together on a larger touch screen display or pad, or on two smaller but separate devices that are communicatively coupled. In the one-handed implementation, right-handed and left-handed versions are each complete in themselves, and are a mirror image of each other. Each one-handed version is complete in itself, but that does not preclude it from being used with its mirror image version at the same time, i.e., right and left handed versions can be used together. There is also a two-handed version that splits the alphanumeric set between the two hands, so that both hands must be used in that version.

The keyless region may use various schemes to sense a given pattern. For example, in one implementation a keyless region is arranged in a limited number of sensing areas (for example, nine or ten) to detect a range of from approximately 26 to approximately 44 different touch patterns. But the sensing surface may use many other techniques for capturing a combination of simultaneous finger touches, such as stock touch sensing technology, imaging, photo, or optical sensing of multiple simultaneous touch contacts, etc.

The keyless region may be dynamically sized to a width dimension that dynamically approximates four finger widths of the user and a height dimension that dynamically approximates three finger thicknesses of an individual user. Since these physical dimensions of a user's fingers may vary, an example system can scale the keyless region to corresponding dimensions.

The database of touch patterns includes at least enough touch patterns and associated communication objects to compose a set of symbols or actions, such as an alphabet of a known language and associated symbols and functions. Thus, each communication object (e.g., alphanumeric character) assigned to a given individual touch pattern may be a letter of an alphabet, a number, a symbol, a word, a phrase, an image, a file operation, or a device navigation function. A digitizer may convert each communication object retrieved by the interpreter into a digital signal for transmission or input into a device.

Example Environment

Figure 2:
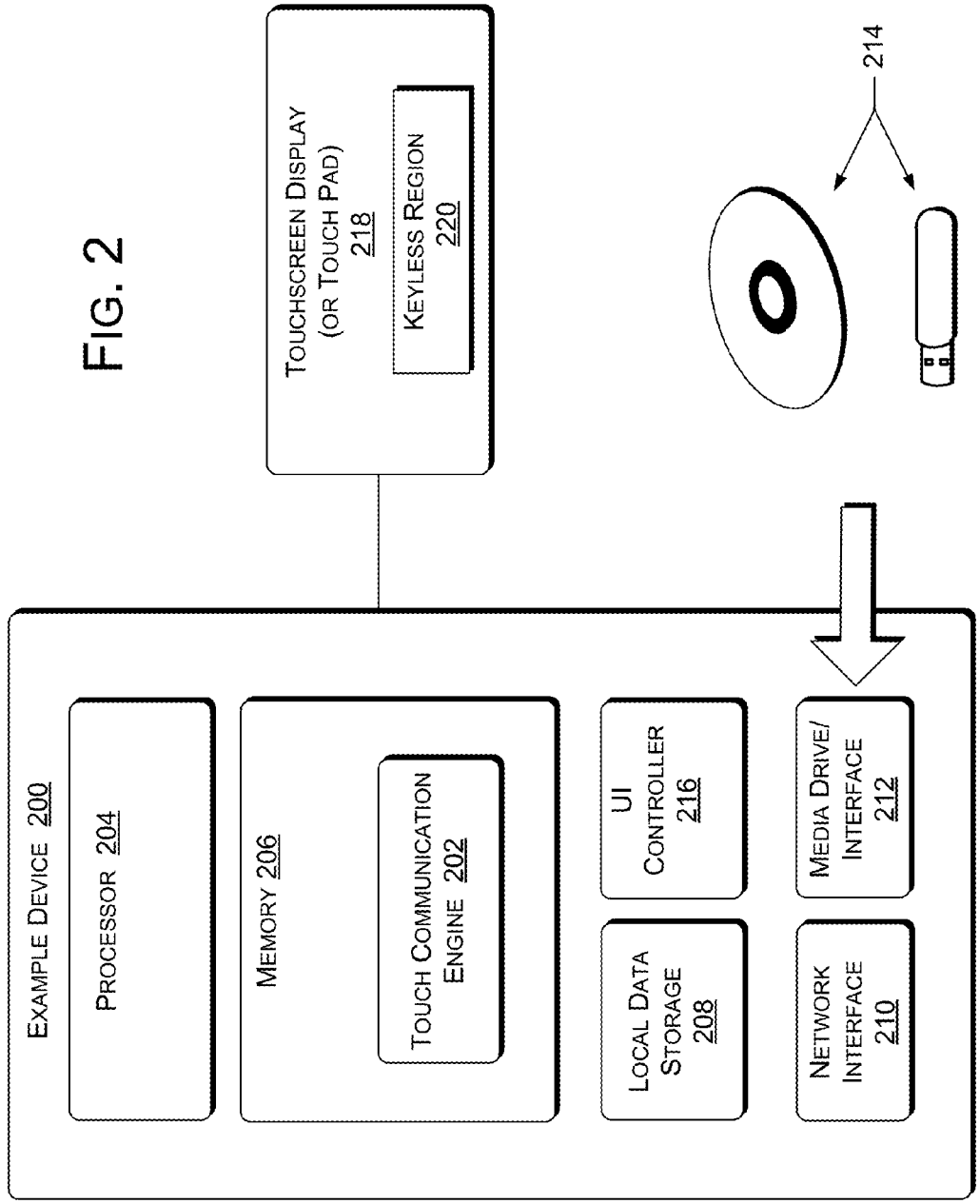
FIG. 2 is a block diagram of an example environment for practicing the touch alphabet and communication system.

FIG. 2 shows the example texting scheme of FIG. 1 in the context and environment of an example cell phone, tablet, computing device, or electronic accessory, in which the touch alphabet can be performed.

An example device 200 shown in FIG. 1 includes or implements a component, such as the example touch communication engine 202 to enable input using the touch alphabet. The touch communication engine 202 is illustrated as software, but can be implemented as hardware or as a combination of hardware and software instructions.

The example device 200 typically has a processor 204, memory 206, data storage 208, and other associated hardware such as a network interface 210 and a media drive/interface 212 for reading a removable storage medium 214. The removable storage medium 214 may be, for example, a compact disk (CD); digital versatile disk/digital video disk (DVD); flash drive, etc.

The removable storage medium 214 may include instructions for implementing and executing the example touch communication engine 202. At least some parts of the example touch communication engine 202 can be stored as instructions on a given instance of the removable storage medium 214, a removable device, or in local data storage 208, to be loaded into memory 206 for execution by the processor 204.

A display and/or user interface (UI) controller 216 coordinates a touchscreen display 218 or other form of touch pad, which provides a means for sensing finger contacts for signaling or gesturing a touch alphabet. Touchscreen display 218 and the term "touch pad" are used interchangeably herein, with respect to their abilities to sense individual and touch finger contacts. The touchscreen display 218 may be located on the example device 200 itself, of may be remote to the example device 200. In one implementation, an example system generates a keyless region 220 on the touchscreen display 218 or touch pad for inputting touch patterns.

Although the illustrated example touch communication engine 202 is depicted as a program loaded into and residing in memory 206, a touch communication engine 202 may be implemented as hardware, such as an application specific integrated circuit (ASIC) or as hardware running software instructions.

The touch communication engine 202 associates input from the touch pad 218 with communication objects, such as characters and functions of a touch alphabet. The example device 200 may use the communication objects for its own touchscreen display 218 or another onboard display, or may send the communication objects to another device, for example, via the network interface 210.

The illustrated example device 200 in FIG. 1 shows components associated with using a touch alphabet. These components are not required to use a touch alphabet, they are shown to provide an illustrative environment. In another context, a sensing pad (i.e., computer accessory) connected to a conventional computer via USB port, for example, can also provide a complete context for practicing one of the touch alphabets described herein.

Example Engine

Figure 3:
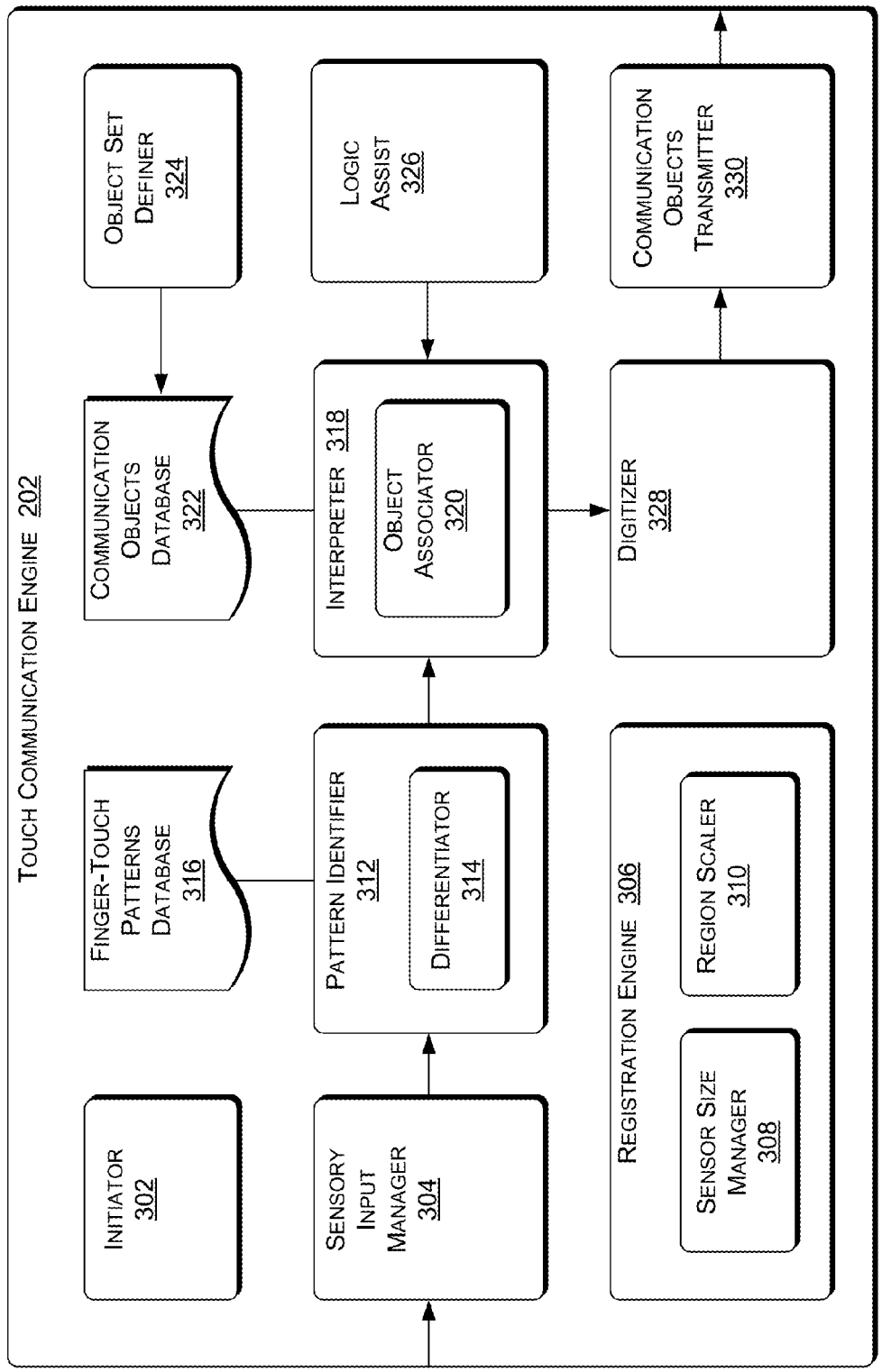
FIG. 3 is a block diagram of an example touch communication engine.

FIG. 3 shows an example touch communication engine 202 in greater detail than in FIG. 2. The illustrated implementation is only one example configuration for the sake of description, to introduce features and components of an engine that can use the example touch alphabets described herein. Thus, the illustrated components are only examples. Different configurations or combinations of components than those shown may be used to practice a touch alphabet. As introduced above, the example touch communication engine 202 can be implemented in hardware, or in combinations of hardware and software. Illustrated components are communicatively coupled with each other for communication as needed. Arrows are shown only to suggest process flow or data flow, since the components can communicate with each other as needed.

The illustrated touch communication engine 202 includes components for sensing and inputting finger contact information, for identifying finger touch patterns, and for associating the identified patterns with assigned communication objects, among others. A list of components in the illustrated example engine includes an initiator 302, a sensory input manager 304, a registration engine 306, a sensor size manager 308, a region scaler 310, a pattern identifier 312, a differentiator 314, a finger-touch patterns database 316, an interpreter 318, an object associator 320, a communication object database 322, an object set definer 324, a logic assist module 326, a digitizer 328, and a communication object transmitter 330.

Operation of the example flow visualization engine 104 will be described below.

Operation of the Example Engine

Example systems, such as a system that uses the example touch communication engine 202 just described, implement a touch alphabet or a set of approximately forty-four unique and ergonomically pleasing fingertip contact gestures, touch codes, or "touch patterns." The set of approximately forty-four touch patterns (per hand) are based on a concept that there are approximately forty-four ways that the four fingers of one hand can comfortably and ergonomically tap, alone or in combination, various touches on a region under the fingers, without appreciably moving the wrist or contorting fingers.

Figure 4:
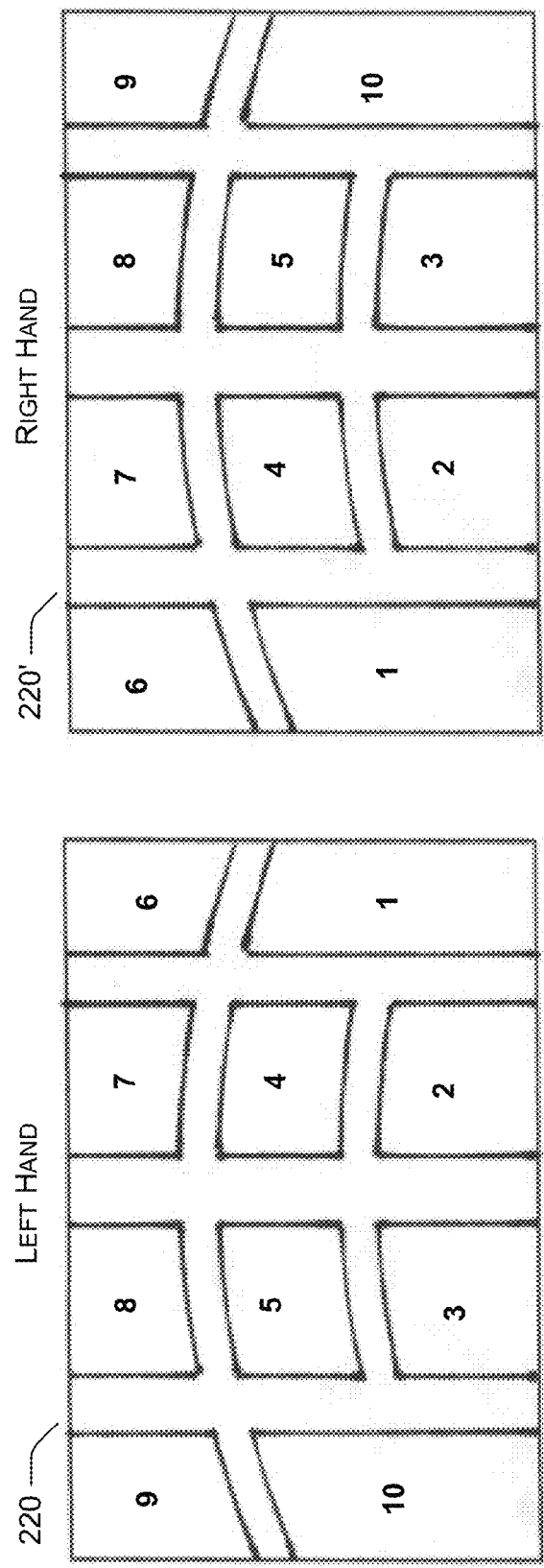
FIG. 4 is a diagram of an example scheme for utilizing sensor areas in a keyless region.
Figure 5:
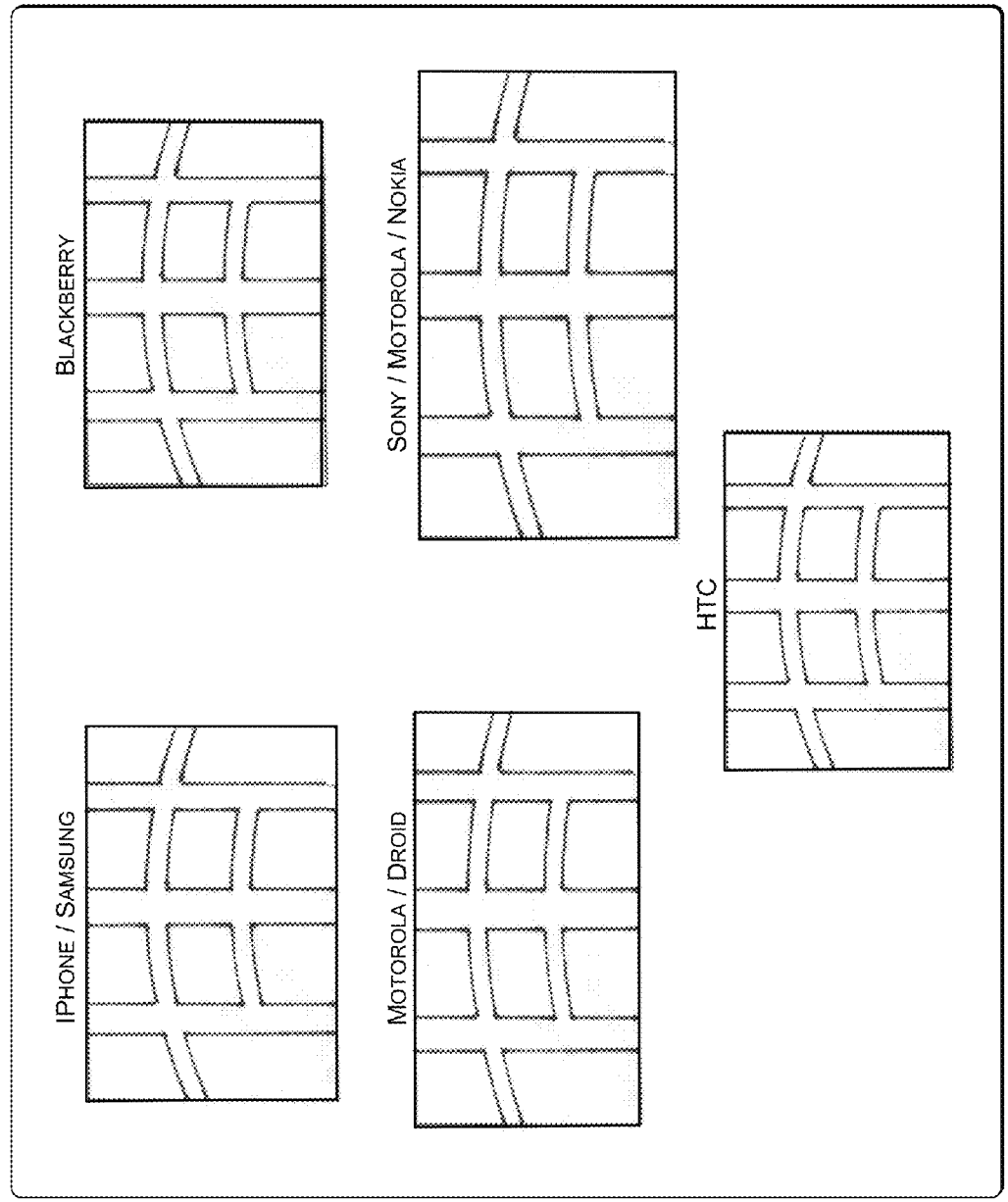
FIG. 5 is a diagram of example keyless regions implemented on popular device display footprints.
Figure 6:
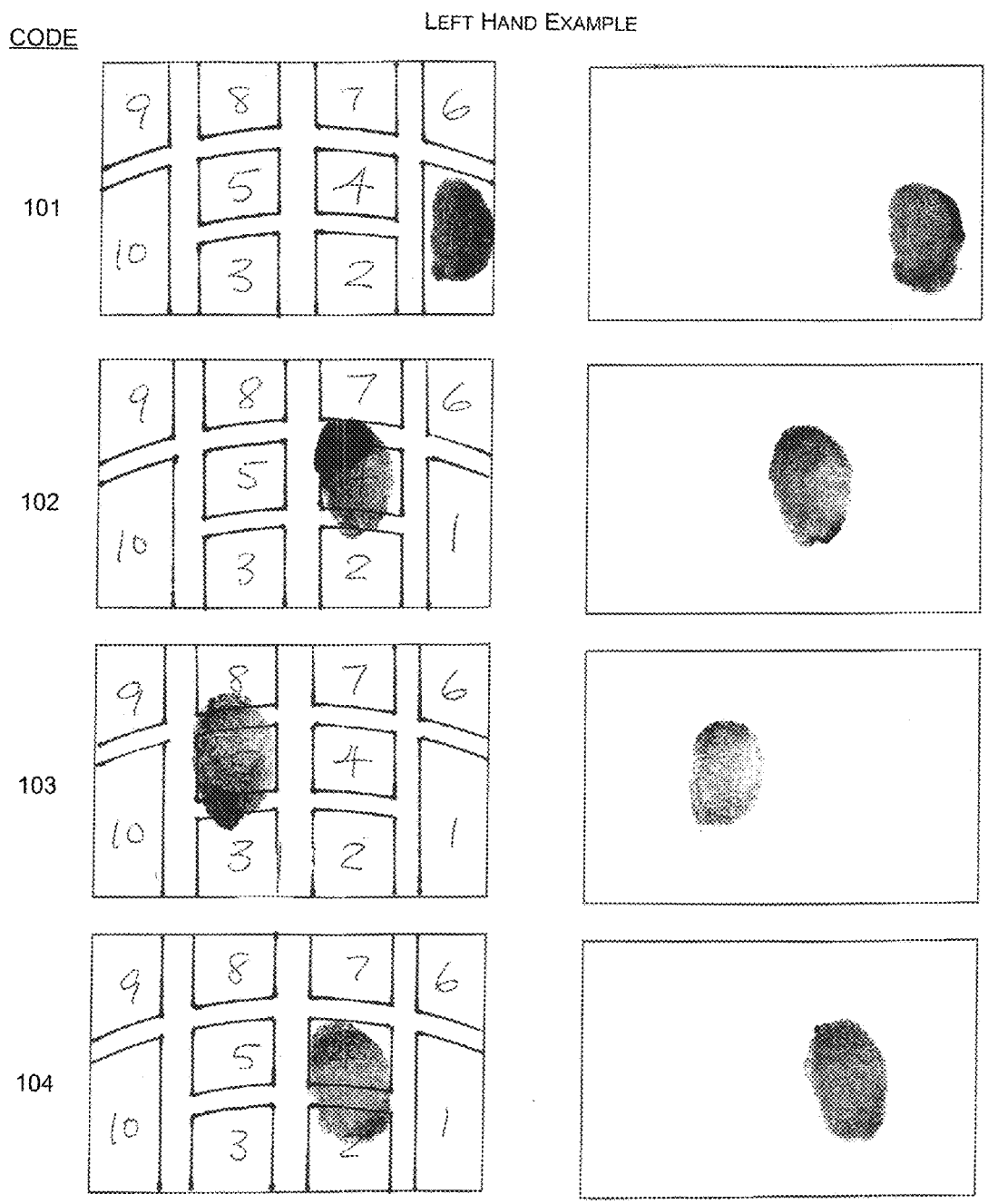
Figure 8:
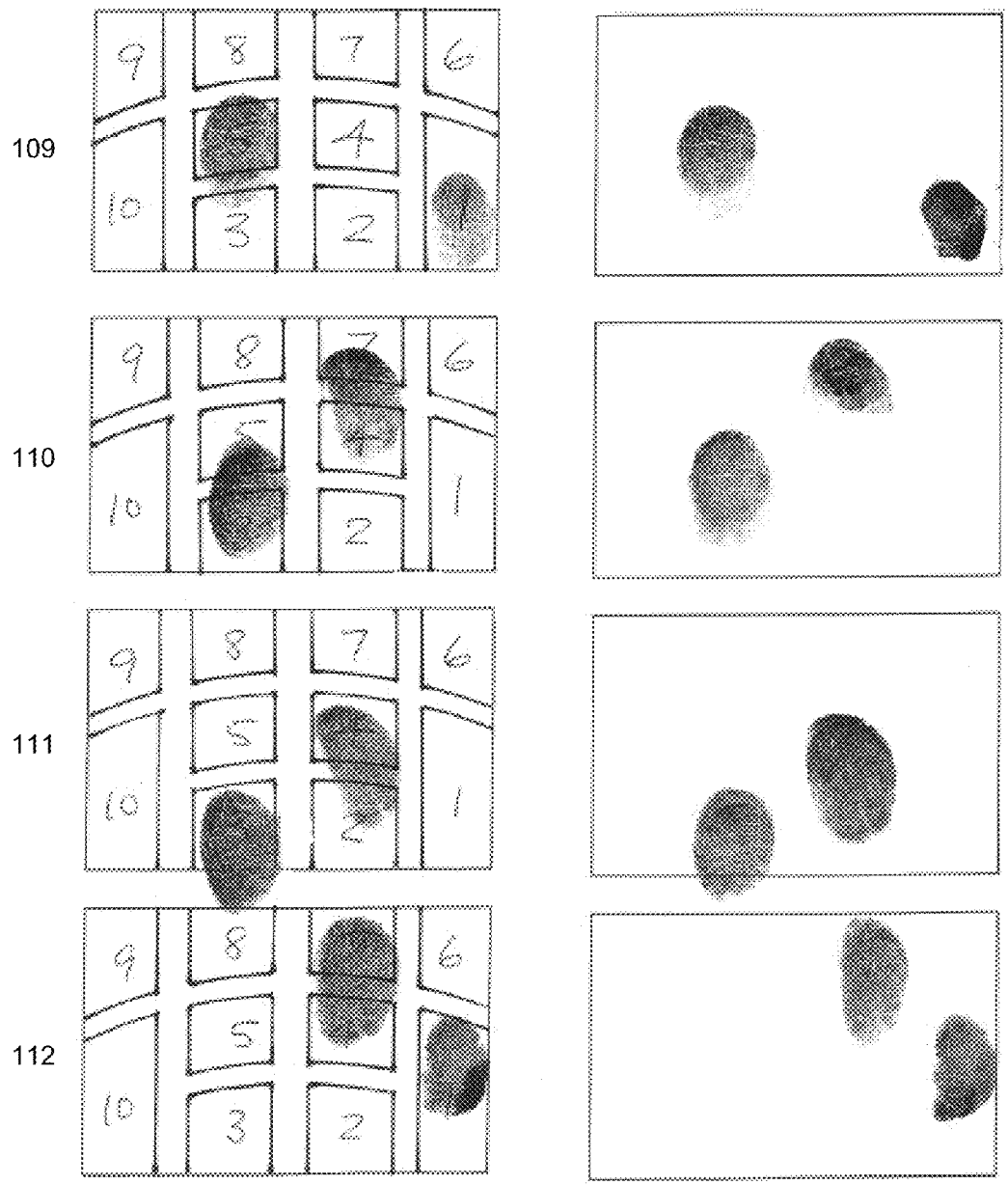
Figure 11:
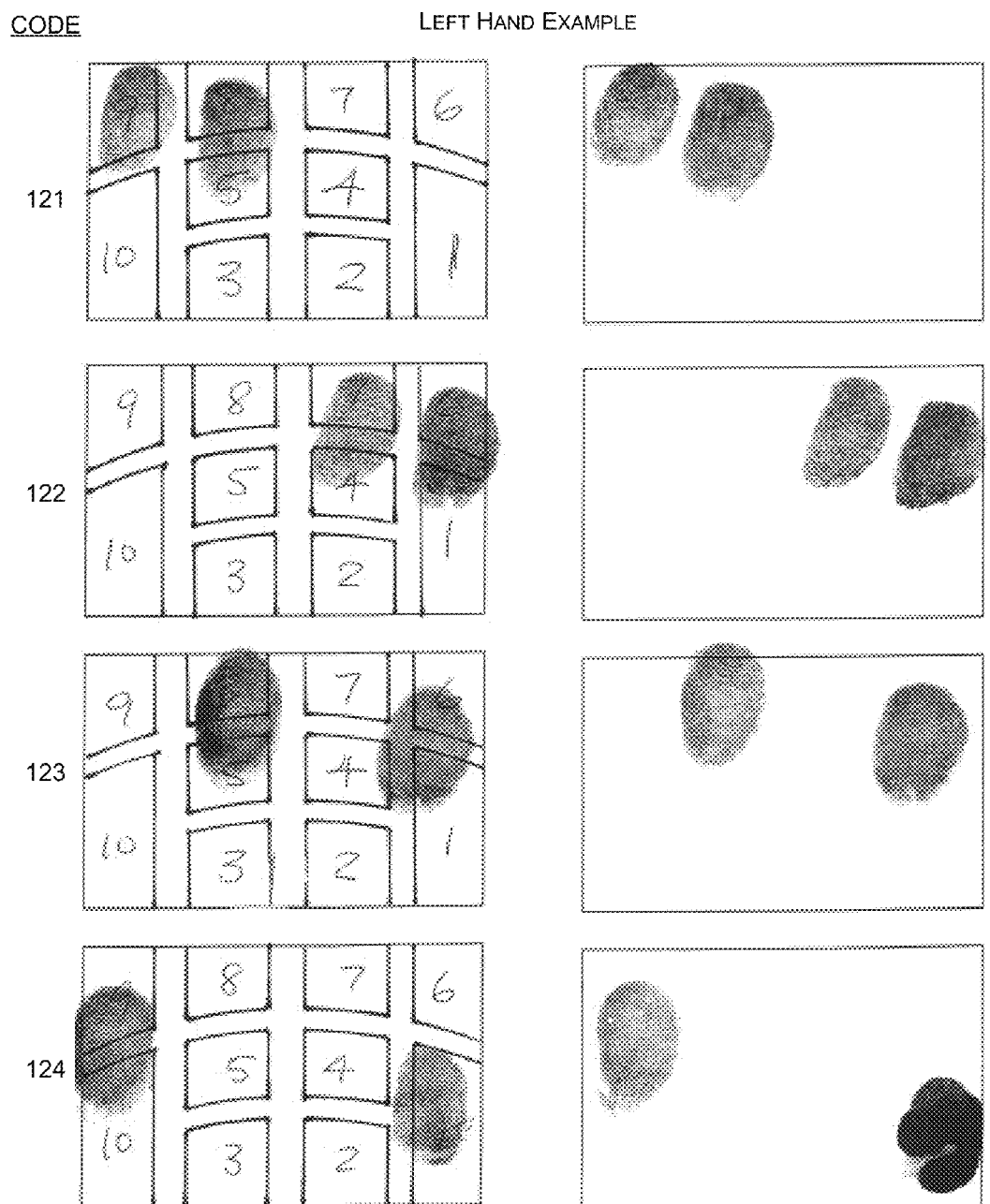
Figure 13:
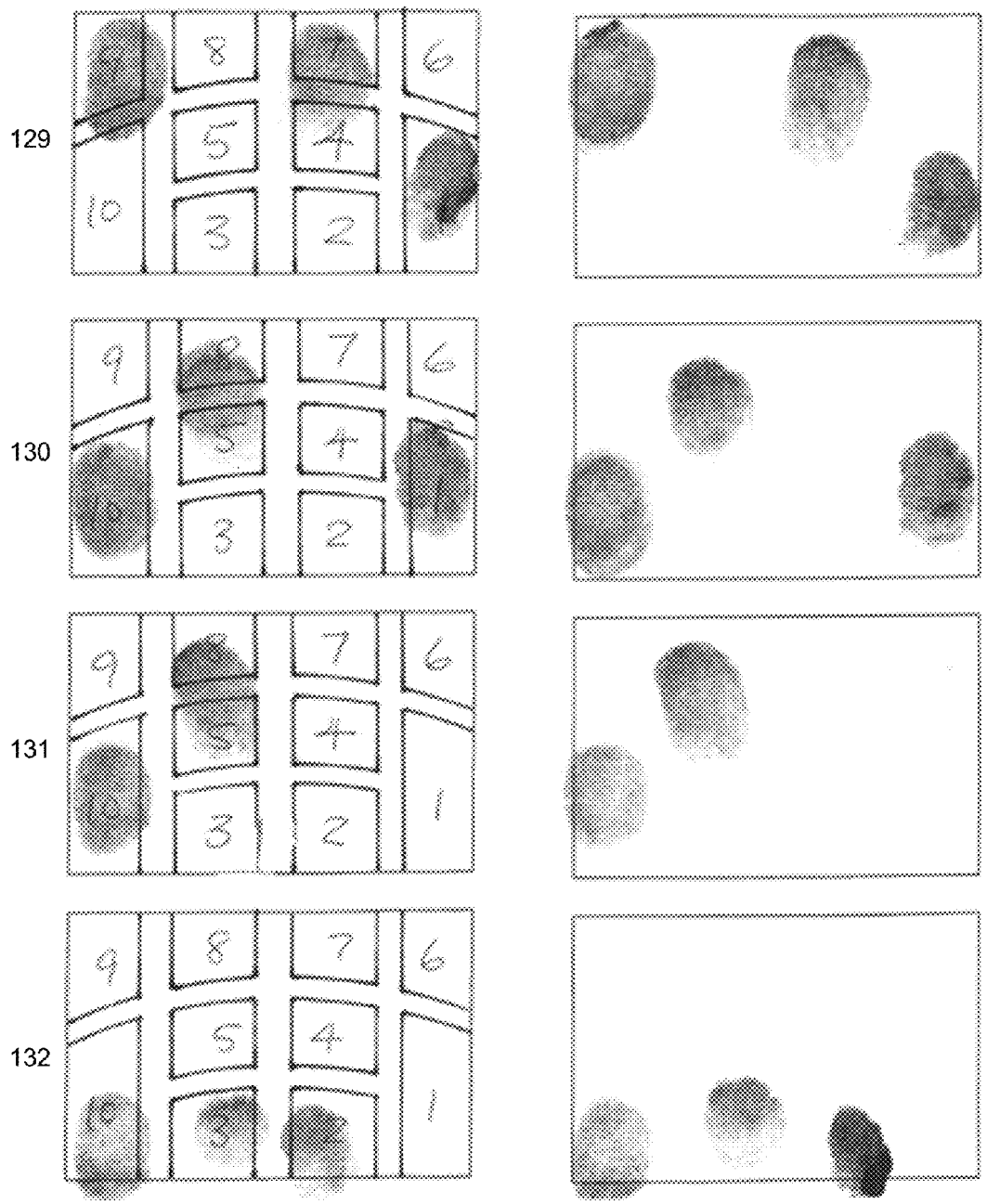
Figure 14:
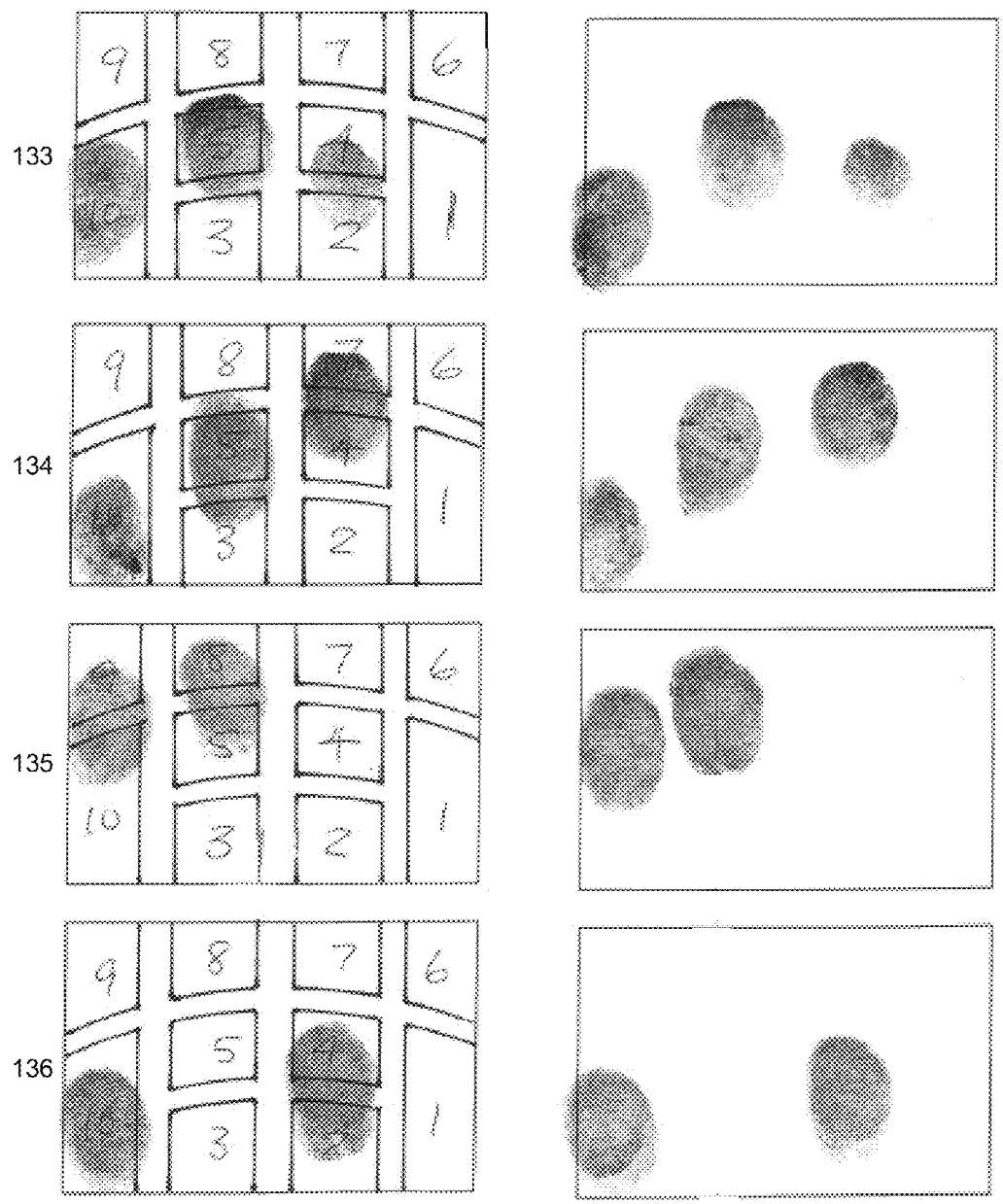
Figure 16:
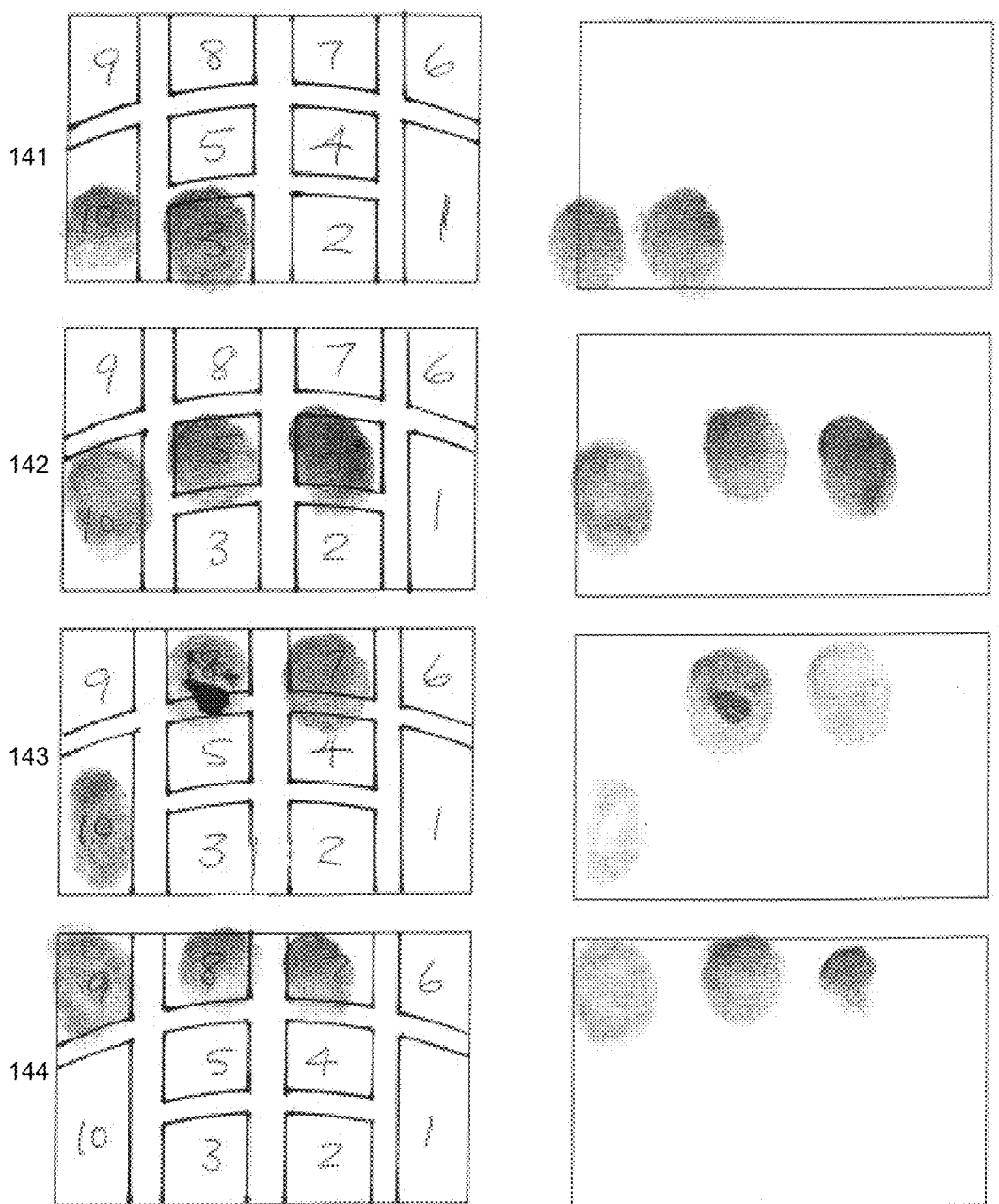

FIG. 4 shows one example scheme for sensing a set of touch patterns. A keyless region 220 is divided into approximately nine to ten sensor areas, as shown. These sensor areas are not visible to the user, but may be made visible for practice, e.g., on a practice pad. The illustrated sensor areas are not keys in a conventional sense, as many of the touch patterns sense a single individual finger on two sensor areas and as part of a large pattern of finger touch contacts with the keyless region 220. Right and left-hand versions of a keyless region 220 are shown. Only one of these versions is needed for a one-handed system, while both may be used with each other for a two-handed system. Either a right-handed or left-handed version of the example scheme can be implemented on many types of communication devices, as shown in FIG. 5. How-ever, many other schemes could be used to capture the touch patterns of a touch alphabet besides the scheme shown in FIG. 4.

FIGS. 6-16 depict a set of approximately forty-four touch patterns that constitute an example "one-handed" finger-touch patterns database 316 (i.e., for the left hand) that can be used by the example touch communication engine 202. The scheme of dividing the keyless region into nine or ten sensor areas is also shown for reference. The forty-four touch patterns can then receive assignment of a selected alphabet, symbol set, and/or function set. Table (1), below, shows fingertip touches for each of the touch patterns in FIGS. 6-16 with reference to the example scheme of dividing the keyless region into sensor areas. The "/" mark in Table (1) indicates touching two sensor areas at the same time, e.g., "7/4" indicates touching pad 7 and pad 4 with the same fingertip at the same time, or alternatively, indicates touching in the area between two sensor areas in the example scheme for dividing the keyless region:

TABLE (1)

| Pattern No. | Sensor Areas Contacted by a Fingertip |
| --- | --- |
| 101 | 1 |
| 102 | 4 |
| 103 | 5 |
| 104 | 4/2 |
| 105 | 5/3 |
| 106 | 1 + 4/2 |
| 107 | 1 + 5/3 |
| 108 | 1 + 4 |
| 109 | 1 + 5 |
| 110 | 7/4 + 5/3 |
| 111 | 4/2 + 3 |
| 112 | 1 + 7/4 |
| 113 | 1 + 8/5 |
| 114 | 7/4 + 5 |
| 115 | 1 + 7/4 + 8/5 |
| 116 | 1 + 7/4 + 5 |
| 117 | 6/1 |
| 118 | 8/5 |
| 119 | 7/4 |
| 120 | 7/4 + 8/5 |
| 121 | 8/5 + 9 |
| 122 | 6/1 + 7/4 |
| 123 | 6/1 + 8/5 |
| 124 | 1 + 9/10 |
| 125 | 1 + 7/4 + 9/10 |
| 126 | 4 + 8/5 + 9/10 |
| 127 | 1 + 8/5 + 10 |
| 128 | 1 + 5 + 10 |
| 129 | 1 + 7/4 + 9 |
| 130 | 6/1 + 8/5 + 10 |
| 131 | 8/5 + 10 |
| 132 | 2 + 3 + 10 |
| 133 | 4/2 + 5 + 10 |
| 134 | 7/4 + 5 + 10 |
| 135 | 8/5 + 9/10 |
| 136 | 4/2 + 10 |
| 137 | 4 + 5 + 10 |
| 138 | 10 |
| 139 | 1 + 10 |
| 140 | 5 + 10 |
| 141 | 3 + 10 |
| 142 | 4 + 5 + 10 |
| 143 | 7 + 8 + 10 |
| 144 | 7 + 8 + 9 |

Table (2) shows an example assignment of alphanumeric characters and functions to the touch patterns:

TABLE (2)

| Letter or Function | Veroplay Touch Code No. |
|---|---|
| A | 101 |
| B | 102 |
| C | 103 |
| D | 104 |
| E | 105 |
| F | 106 |
| G | 107 |
| H | 108 |
| I | 109 |
| J | 110 |
| K | 111 |
| L | 112 |
| M | 113 |
| N | 114 |
| O | 115 |
| P | 116 |
| Q | 117 |
| R | 118 |
| S | 119 |
| T | 120 |
| U | 121 |
| V | 122 |
| W | 123 |
| X | 124 |
| Y | 125 |
| Z | 126 |
| Space | 138 |
| Return | 139 |
| Period | 140 |
| Comma | 141 |
| Question Mark | 140 twice |
| Exclamation | 141 twice |
| Capitalize Next Letter | 142 |
| Caps On | 142 twice (again = off) |
| Enter Numbers Function | 143 (again = off) |
| Choose Function 1-10 | 144 |

Table (3) shows another example assignment of alphanumeric characters and functions to the touch patterns:

TABLE (3)

| Veorplay Touch Code | Modern Roman | Phoenician | Arabic | Greek | Cyrillic | Etc. |
|---|---|---|---|---|---|---|
| 101 | A | aleph | A | APHA | A | |
| 102 | B | beth | B | BETA | B | |
| 103 | C | gimmel | T | GAMMA | V | |
| 104 | D | daleth | TH | DELTA | G | |
| 105 | E | he | J | EPSILON | D | |
| 106 | F | waw | H | ZETA | E | |
| 107 | G | zayin | KH | ETA | YO | |
| 108 | H | heth | D | THETA | ZH | |
| 109 | I | teth | DH | IOTA | Z | |
| 110 | J | yodh | R | KAPPA | I | |
| 111 | K | kaph | Z | LAMBDA | Y | |
| 112 | L | lamedh | S | MU | K | |
| 113 | M | mem | SH | NU | L | |
| 114 | N | nun | S | XI | M | |
| 115 | O | samekh | D | OMICRON | N | |
| 116 | P | 'ayin | T | PI | O | |
| 117 | Q | pe | TH | RHO | P | |
| 118 | R | tsade | ' | SIGMA | R | |
| 119 | S | qoph | GH | TAU | S | |
| ETC | | | | | | |
| 144 | | | | | | |

Figure 17:
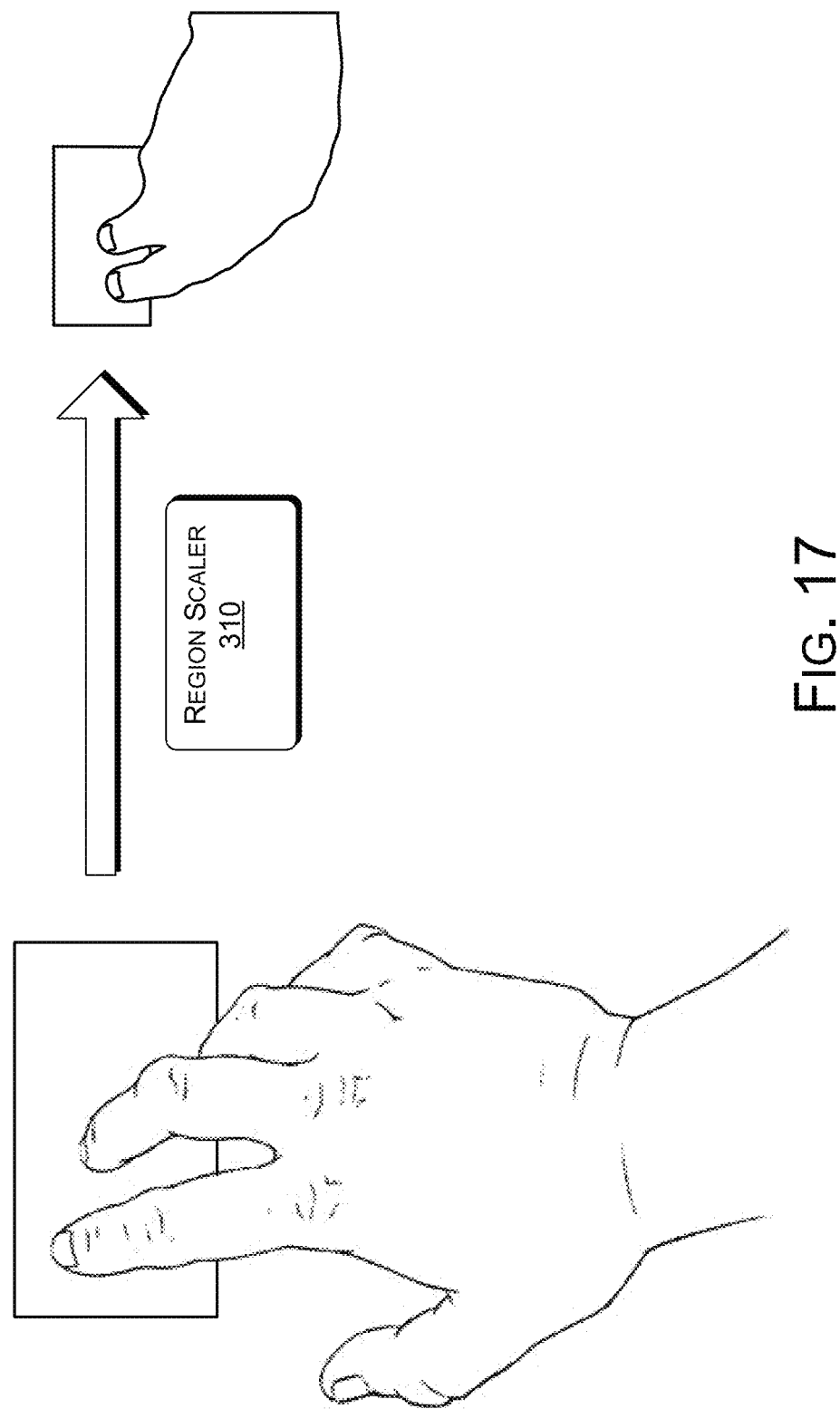
FIG. 17 is a diagram of example keyless region scaling.
Figure 18:
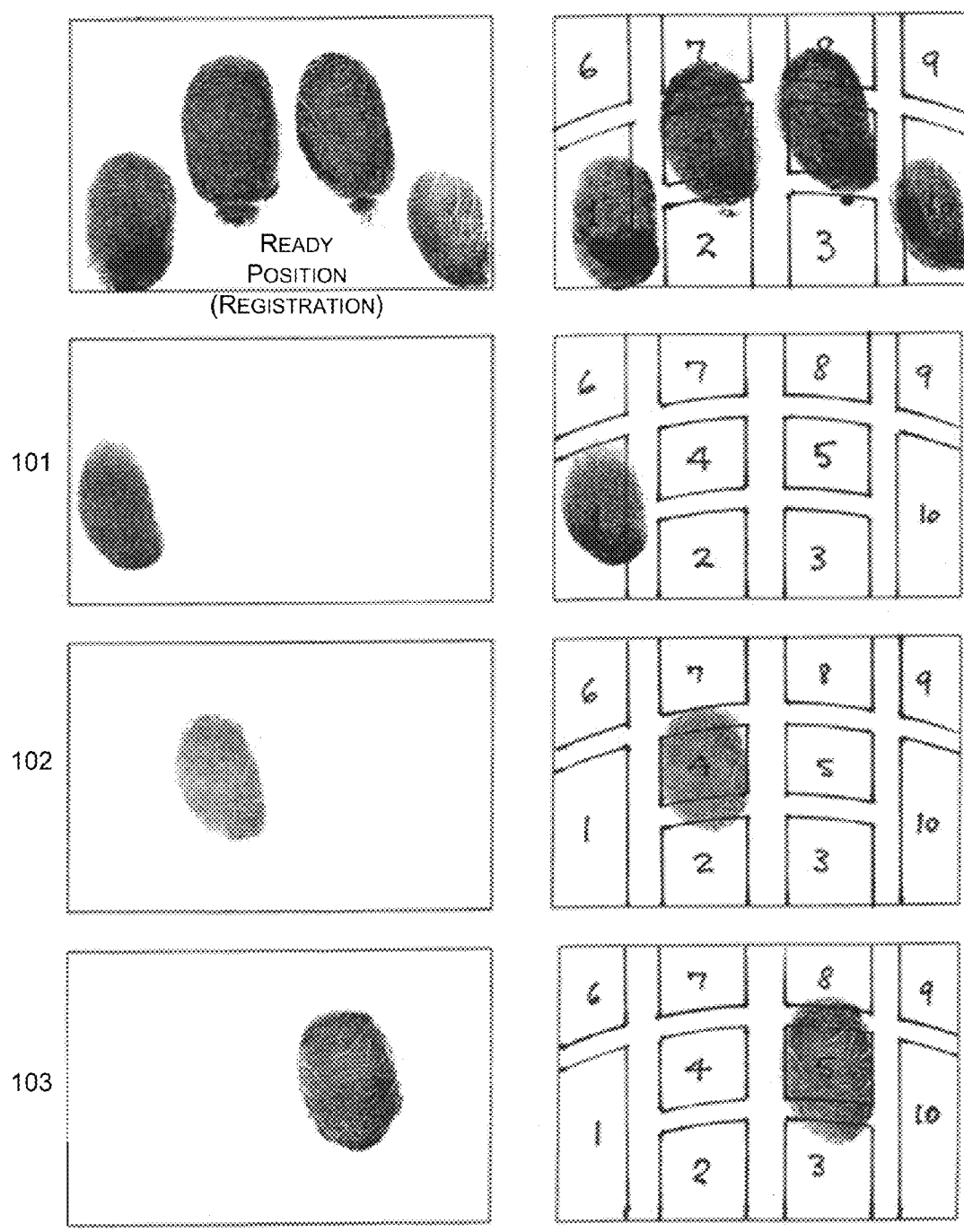
Figure 19:
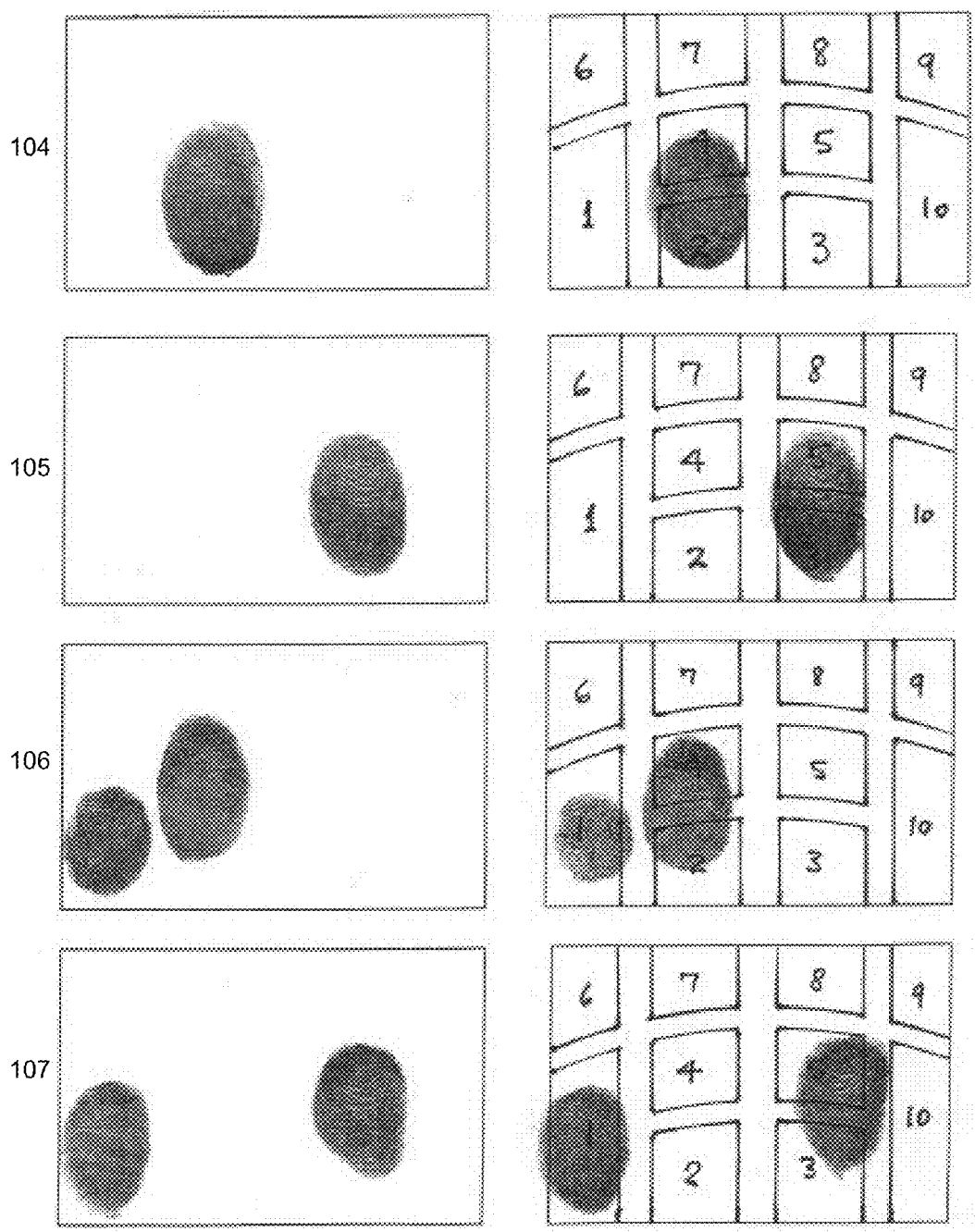
Figure 20:
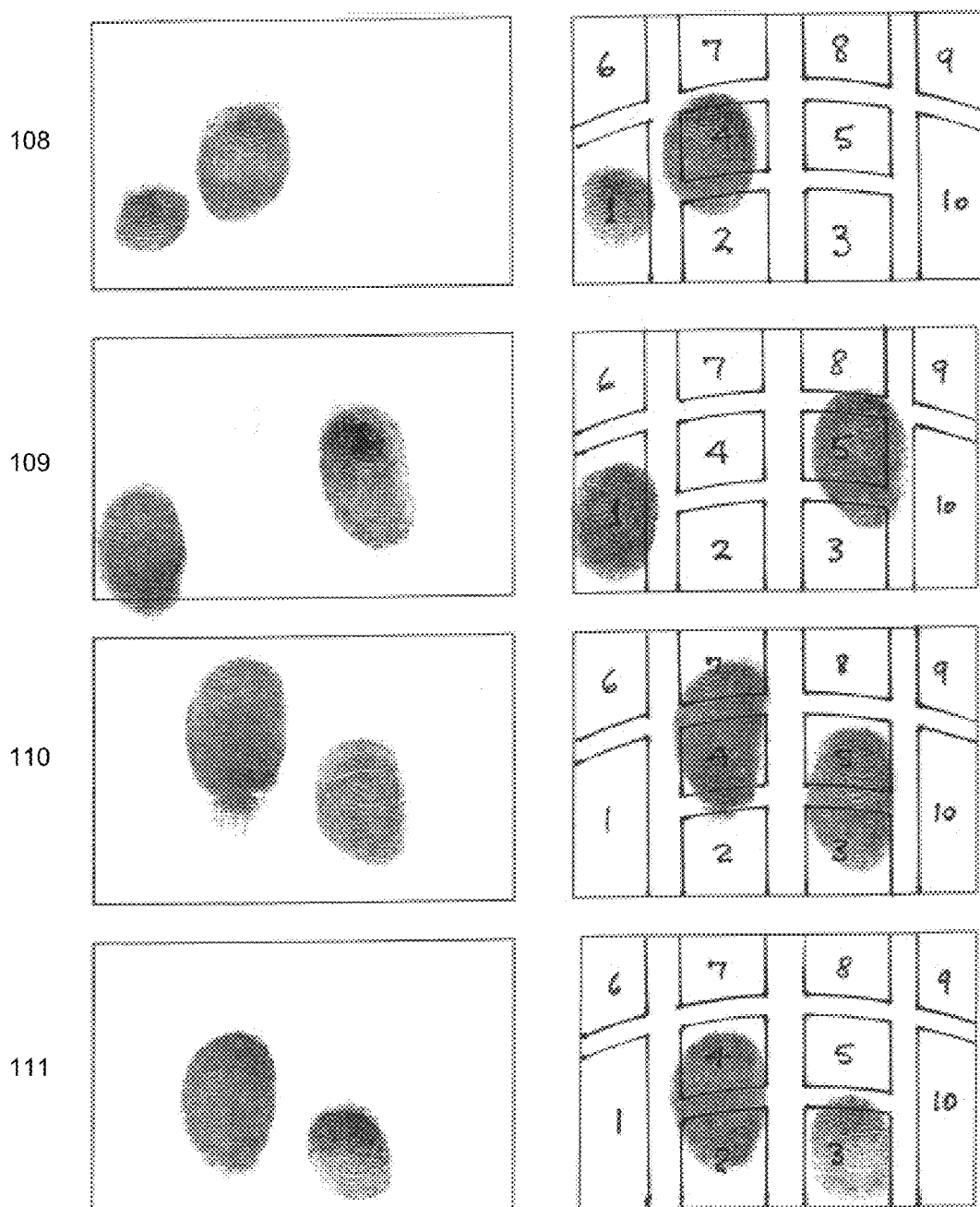
Figure 21:
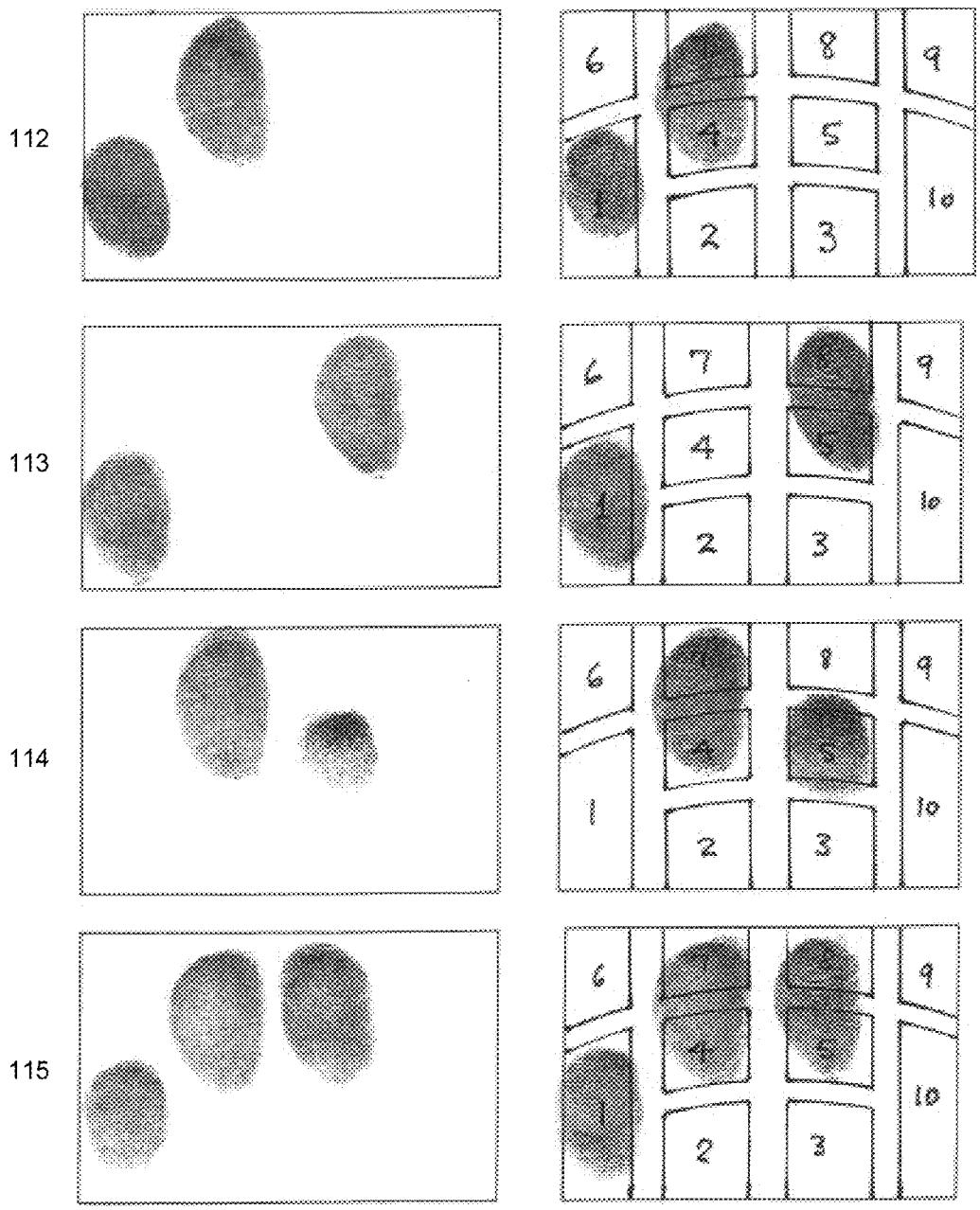
Figure 22:
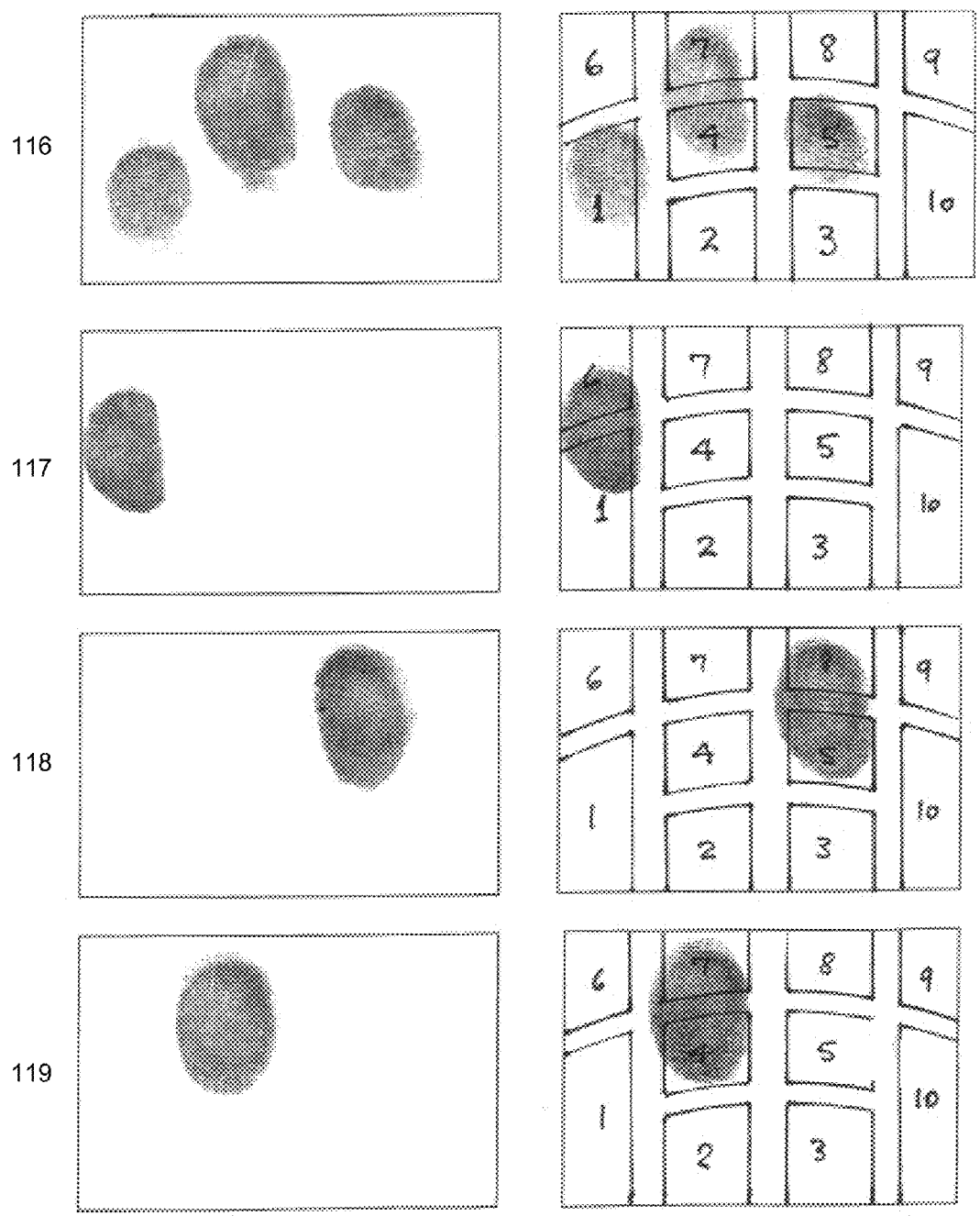
Figure 23:
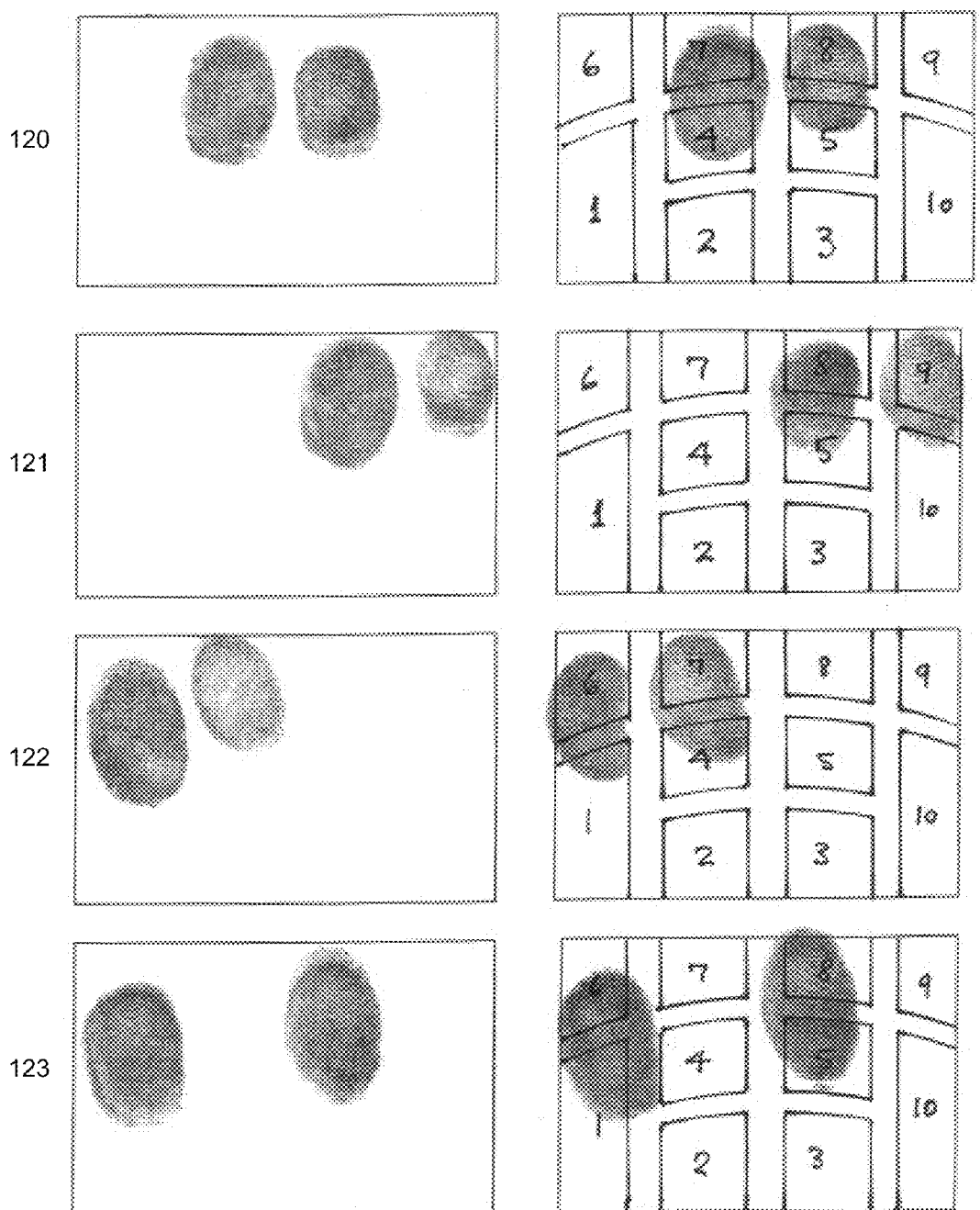

As shown in FIG. 17, the limited, keyless region 220 for multi-finger contact is scalable, and typically scaled to dimensions that can fit on a given cell phone or other small device. Thus, a user can comfortably tap an entire alphabet and related functions, with one hand, without having to visualize the user interface surface (i.e., without having to look at the touch surface and without having to hunt for individual keys as with conventional keypads and keyboards).

In one implementation, the region scaler 310 of the example touch communication engine 202 can scale two keyless regions, one for each hand, on a touch screen display of one device, or even across multiple devices, when the devices are in communication.

Figure 25:
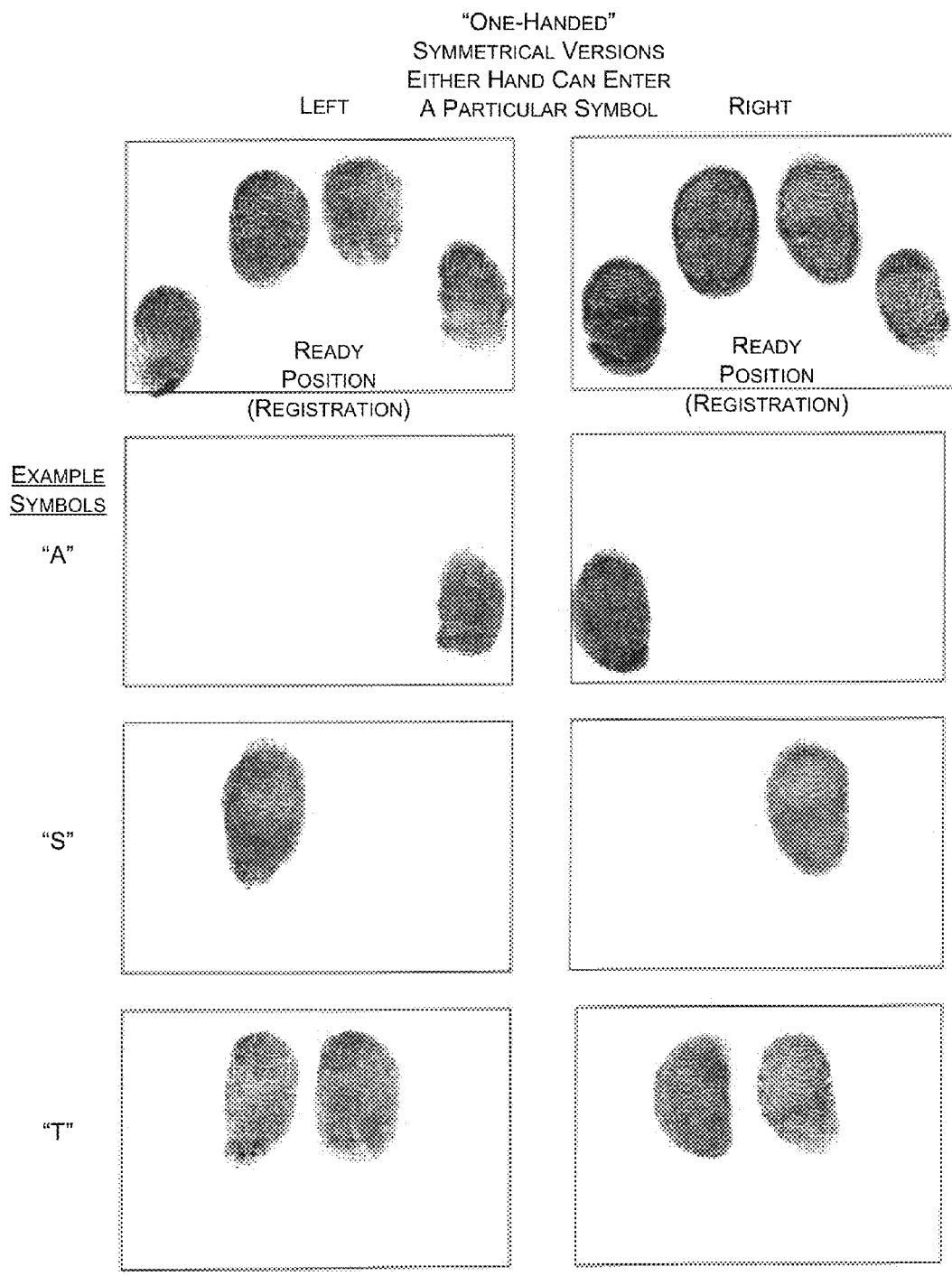
FIG. 25 is a diagram of symmetry between left-handed and right-handed implementations of an example system.

FIGS. 18-24 show another set of touch patterns that constitute an example finger-touch patterns database 316, for the right hand, that can be used by the example touch communication engine 202. As shown in FIG. 25, the set of touch patterns for the right hand shown in FIG. 18-24 is symmetrical to the set of touch patterns for the left hand shown in FIGS. 6-16. The scheme of dividing the keyless region into nine or ten sensor areas is also shown side-by-side for reference. This illustrated set of touch patterns (for the right hand, shown in FIGS. 18-24) has example alphanumeric characters and functions assigned to each individual touch pattern, as shown. The illustrated alphanumeric characters and functions are shown as a sample of programming the touch patterns 316.

The one-handed implementation can be performed on the relatively small window of most touch screen cell phones, and in addition, anywhere on larger screens, such as a portion of a tablet computer display.

An example two-handed system divides the target alphabet and functions between left and right hands.

Table (4), for example, shows an example assignment of touch patterns to alphanumeric characters and functions, divided between left and right hands:

TABLE (4)

| Letter or Function | Hand | Touch Pattern No. |
|---|---|---|
| A | right | 101 |
| B | left | 102 |
| C | left | 103 |
| D | left | 104 |
| E | right | 105 |
| F | left | 106 |
| G | right | 107 |
| H | left | 108 |
| I | right | 109 |
| J | left | 110 |
| K | left | 111 |
| L | left | 112 |
| M | left | 113 |
| N | left | 114 |
| O | right | 115 |
| P | left | 116 |
| Q | left | 117 |
| R | left | 118 |
| S | right | 119 |
| T | right | 120 |
| U | right | 121 |
| V | left | 122 |
| W | left | 123 |
| X | left | 124 |
| Y | right | 125 |
| Z | left | 126 |
| Space | either hand | 138 |
| Return | either hand | 139 |
| Period | right | 140 |
| Comma | right | 141 |
| Question Mark | left | 140 |
| Exclamation | left | 141 |
| Capitalize Next Letter | left | 142 |
| Caps On | right | 142 |
| Enter Numbers Function | right | 143 (again = off) |
| Choose Function 1-10 | right | 144 |

Figure 26:
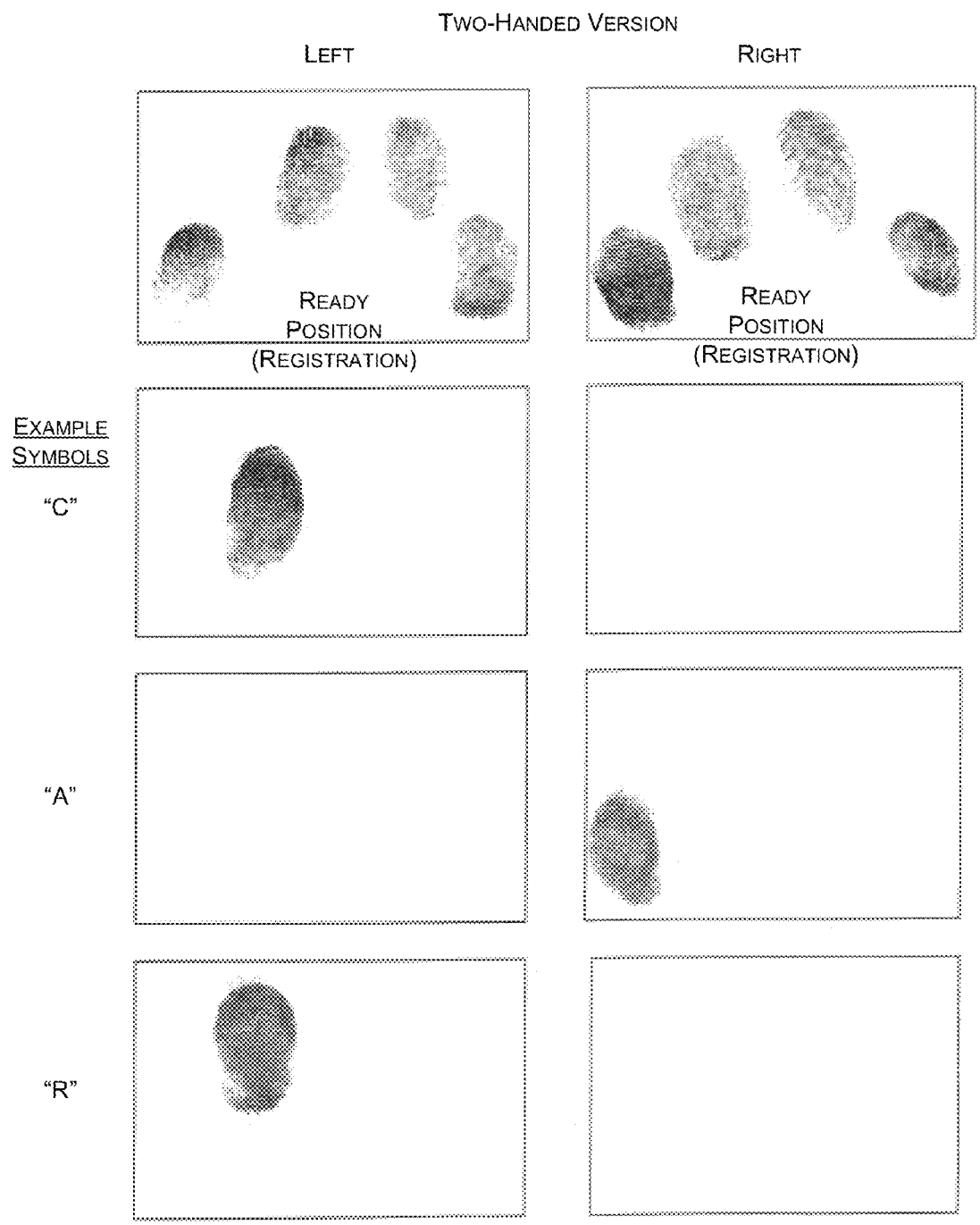
FIG. 26 is a diagram of example texting using a two-handed implementation of the system.

FIG. 26 shows an example texting of the example word "car," using an implementation of the two-handed system described above. Four fingers of each hand register a keyless region for input for each hand. The left hand enters "C", the right hand enters "A", and the left hand enters "R", and so forth.

Figure 27:
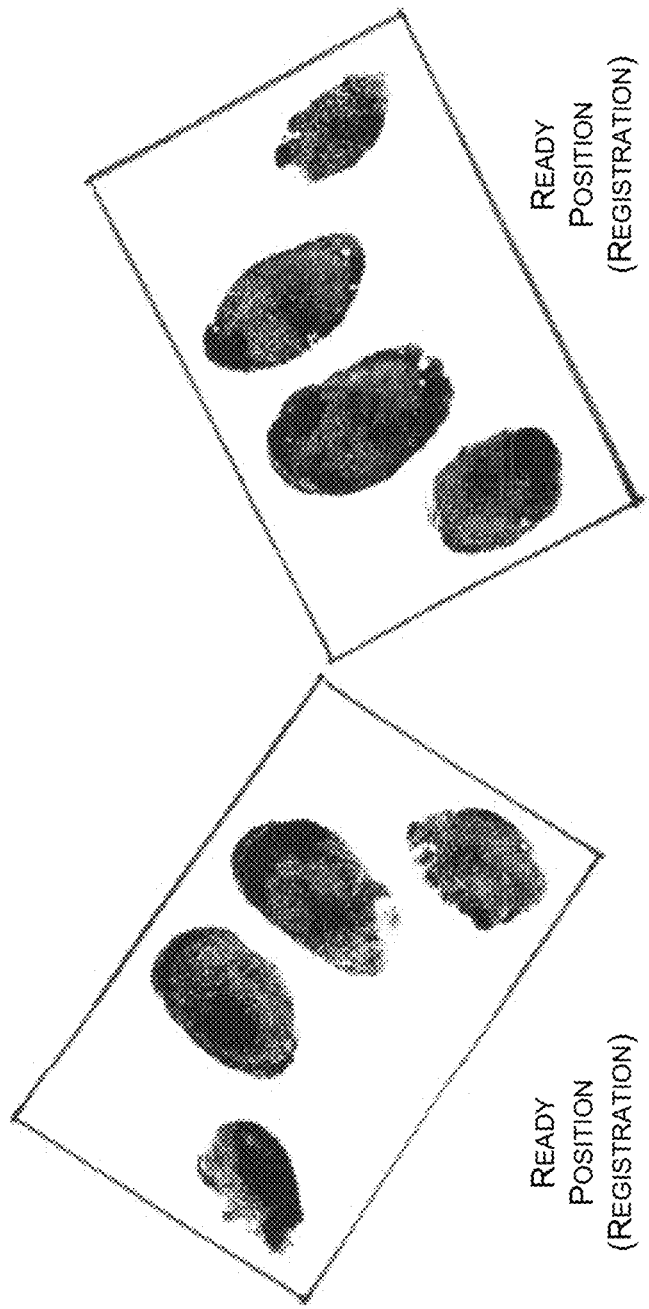
FIG. 27 is a diagram of two-handed registration of keyless regions for user input.

Returning to FIG. 3, which shows the example touch communication engine 202, the initiator 302, in conjunction with the sensory input manager 304, senses the presence of four adjacent fingertips contacting the surface of a touch screen display 218 or touch pad, and initiates further action by the example touch communication engine 202. The initiator 302 may signal the host device to switch data input of a user interface to the example touch communication engine 202. Once control of user input is handed over to the example touch communication engine 202, the registration engine 306 generates a keyless region on the touch screen display 218. The region scaler 310 generates a keyless region 220 with size dimensions appropriate for the size of the user's fingertips, and the sensor size manager 308 scales sensor schemes, if any, to the dimensions of the keyless region. FIG. 27 shows the registration engine 306 generating respective keyless regions 220 for a two-handed implementation of the system.

In one implementation, an example system defines the dimensions of a window, pane, or keyless region where the user will perform the communication gestures, based on the user casually placing four finger of one hand abreast on any part of the touch-sensitive display surface (e.g., outstretched fingers of either hand). For two-handed communication, the user can create two sensory input areas by placing four fingers of each hand to initiate keyless regions for input on one or more touch-sensitive display surfaces.

In one implementation, an initial four finger contact constitutes a registration that informs the example system that 1) the user wishes to communicate via the example touch alphabet; 2) "where" the user will be touch-communicating; and 3) whether the user will be communicating with the right, left, or both hands.

After the initial registration, the user can perform a series of the aforementioned finger touch patterns that represent the assigned letters, numbers, and/or desired functions in a selected alphanumeric scheme and function set.

The pattern identifier 312 includes a differentiator 314 that matches the sensory input (fingertips placements sensed) with the database of finger-touch patterns 316. The pattern identifier 312 may contain logic to interpret variations in fingertip placement and allow adjustment of the sense tolerances. For example, in one implementation, the pattern identifier 312 is configured to interpolate and identify each touch code or gesture by its:

1) relative position to the initial four finger registration;
2) relative position of the fingers used in each touch;
3) relative position of the current touch to the last touch; and if needed:
4) the relative position of the current touch to the NEXT touch; and also:
5) these four combined with higher spelling and grammar logic, automatic spell correction, etc.

When a touch pattern is identified, then the interpreter 318 includes an object associator 320 to match the sensed touch pattern with an assigned symbol or function from the communication objects database 322 (e.g., a letter of the alphabet or navigation function). This assignment of a communication object may be guided by a logic assist module 326 that applies known spell-check and grammar rules to discern what the operator meant to type or text.

An object definer 324 allows a user or manufacturer to preprogram the communication objects to be associated with touch patterns, for example, letters of an alphabet, numbers, symbols, words, phrases, images, file operations, or device navigation functions may all be associated with a touch pattern.

A digitizer 328 may be used to convert the communication object to a data signal representing user input appropriate for the particular device. Likewise, a communication objects transmitter 330 may send the communication objects to a particular device, especially when the example touch communication engine 202 is used in a device that is mainly or exclusively a user input device (e.g., standalone touch pad).

Example Methods

Figure 28:
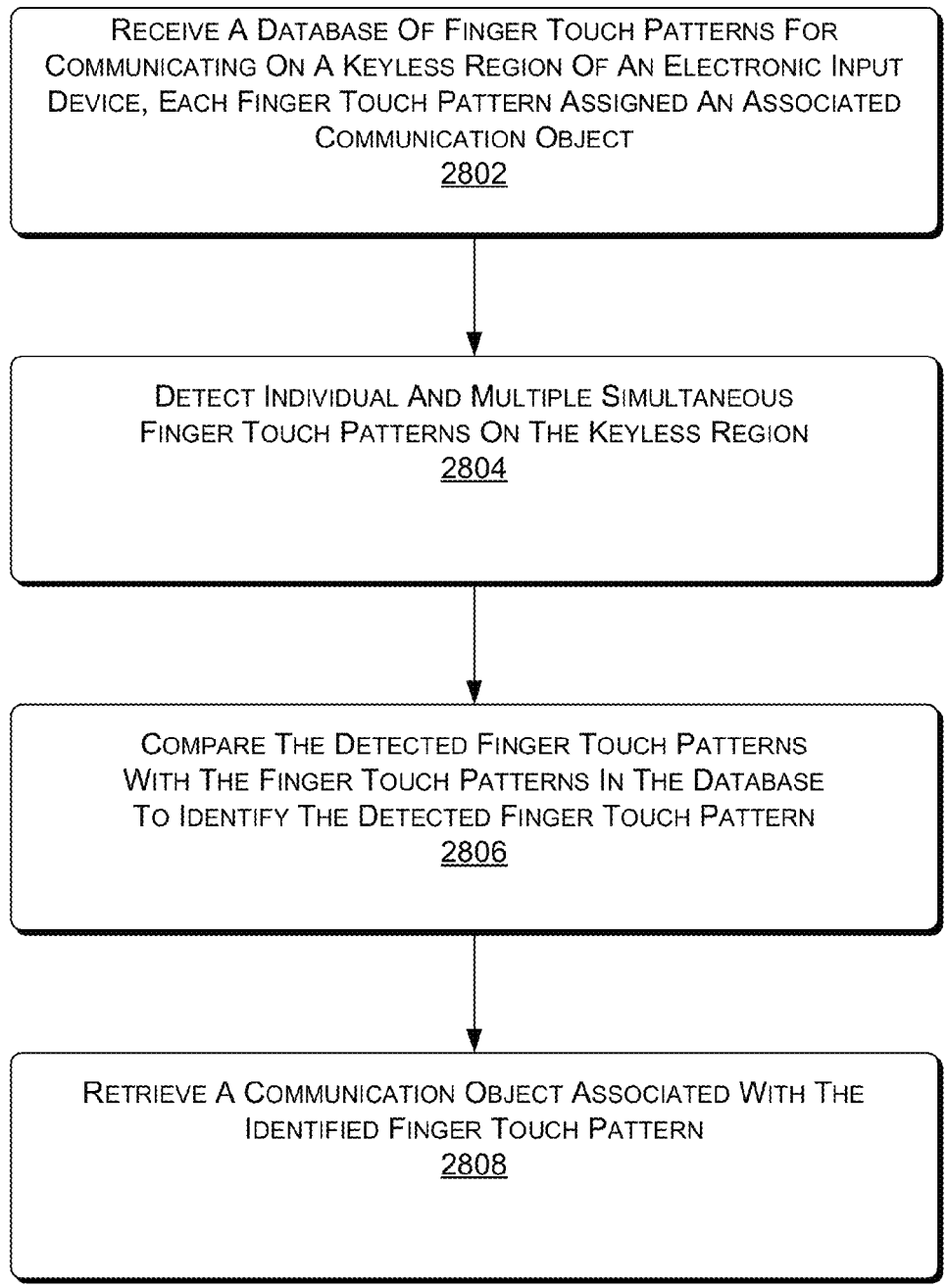
FIG. 28 is a flow diagram of an example method of using a touch alphabet.

FIG. 28 is an example method 2800 of utilizing a touch alphabet. In the flow diagram, the operations are summarized in individual blocks. The example method 2800 may be performed by hardware or combinations of hardware and software, for example, by the example touch communication engine 202.

At block 2802, a database of fingertip touch patterns is received for communicating on a keyless region of an electronic input device. Each fingertip touch pattern is assigned an associated communication object.

At block 2804, individual and multiple simultaneous fingertip touch patterns are detected on the keyless region.

At block 2806, the detected fingertip touch patterns are compared with the fingertip touch patterns in the database to identify the detected touch pattern.

At block 2808, a communication object associated with the identified fingertip touch pattern is retrieved.

CONCLUSION

Although exemplary systems and methods have been described in language specific to structural features and/or methodological acts, it is to be understood that the subject matter defined in the appended claims is not necessarily limited to the specific features or acts described. Rather, the specific features and acts are disclosed as exemplary forms of implementing the claimed systems, methods, and structures.

The invention claimed is:

1. A system, comprising:
a touchscreen capable of sensing multiple simultaneous finger contacts;
a rectangular area of the touchscreen partitioned into ten touch sensing areas distributed in the rectangular area for ergonomic access by four fingers of a single human hand;
a database of touch patterns each assigned a character of an alphabet, the database comprising an alphabet of touch patterns;
the alphabet of touch patterns composed of either one single, two simultaneous, or three simultaneous of the finger contacts on the ten touch sensing areas; and
a pattern identifier to associate a digital signal representing the assigned character of the alphabet with each input touch pattern.

2. The system of claim 1, further comprising two rectangular areas each comprising the ten touch sensing areas, each rectangular area separately receiving input from a right hand or a left hand of a user, each of the two touchscreens configured to sense the entire alphabet performable by fingers of one hand of the user as dual inputs to a single instance of the pattern identifier.

3. The system of claim 2, wherein each touch pattern comprises a natural configuration of one finger position, two finger positions, or three finger positions.

4. The system of claim 1, further comprising:
an initiator for sensing four adjacent simultaneous finger contacts on the touchscreen to signal a host device to switch data input of the touchscreen to a set of touch patterns representing an alphabet;

a registration engine for designating the rectangular area of the touchscreen for input of the touch patterns, the rectangular area having a length approximating the four adjacent simultaneous finger contacts, and a width approximately two-thirds of the length; and a region scaler, to sense a size of a touch contact or a size of multiple touch contacts on the touchscreen and scale the designated rectangular area based on the size of the touch contact or the size of the multiple touch contacts.

5. The system of claim 1, wherein the touchscreen comprises at least part of a user interface of a device selected from the group consisting of a cell phone, a computing device, a tablet device, and a touch pad.

6. The system of claim 1, wherein the set of touch patterns further comprises a touch pattern assigned from the group consisting of a number, a symbol, a word, a phrase, an image, a file operation, and a device navigation function.

7. A method, comprising:
electronically designating a rectangular area of a touchscreen for touch gesture input of finger contacts;
partitioning the rectangular area into ten touch sensing areas distributed in the rectangular area for ergonomic access by four fingers of a single human hand;
defining a database of touch gestures each assigned a character of an alphabet, the database comprising an alphabet of touch gestures;
the alphabet of touch gestures composed of either one single, two simultaneous, or three simultaneous of the finger contacts on the ten touch sensing areas;
sensing a touch gesture in the rectangular area;
decoding each sensed touch gesture into an assigned character of the alphabet.

8. The method of claim 7, further comprising electronically designating two of the rectangular areas for separately sensing the touch gestures performable by fingers of a right hand of a user on a first instance of the rectangular area, and the touch gestures performable by fingers of a left hand of the user on a second instance of the rectangular area as dual inputs for the decoding of each sensed touch gesture into an assigned character of the alphabet.

9. The method of claim 8, wherein each touch gesture comprises a natural configuration of one finger position, two finger positions, or three finger positions.

10. The method of claim 7, further comprising scaling the rectangular area based on a size of a touch contact on the touchscreen.

11. The method of claim 7, further comprising assigning one of a number, a symbol, a word, a phrase, an image, a file operation, or a device navigation function to a touch gesture from the set of multiple different touch gestures.

* * * * *